(12) United States Patent
Bacon et al.

(10) Patent No.: US 10,336,459 B2
(45) Date of Patent: Jul. 2, 2019

(54) CLAMPED SPLINES FOR AIRCRAFT ENGINE MOUNT ASSEMBLIES

(71) Applicant: Bell Helicopter Textron Inc., Fort Worth, TX (US)

(72) Inventors: Bruce Bennett Bacon, Forth Worth, TX (US); Brett Rodney Zimmerman, Fort Worth, TX (US); Clegg Benjamin Brian Smith, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 423 days.

(21) Appl. No.: 15/409,996

(22) Filed: Jan. 19, 2017

(65) Prior Publication Data

US 2017/0217596 A1    Aug. 3, 2017

Related U.S. Application Data

(60) Provisional application No. 62/289,766, filed on Feb. 1, 2016.

(51) Int. Cl.
| | |
|---|---|
| *B64D 27/26* | (2006.01) |
| *B64C 29/00* | (2006.01) |
| *F02C 7/20* | (2006.01) |
| *F16F 15/06* | (2006.01) |
| *B64C 27/00* | (2006.01) |
| *B64D 27/00* | (2006.01) |
| *B64D 29/02* | (2006.01) |
| *F16B 2/06* | (2006.01) |
| *B64D 27/10* | (2006.01) |
| *F16F 1/16* | (2006.01) |

(52) U.S. Cl.
CPC .............. *B64D 27/26* (2013.01); *B64C 27/00* (2013.01); *B64C 29/0033* (2013.01); *B64D 27/00* (2013.01); *B64D 27/10* (2013.01); *B64D 29/02* (2013.01); *F02C 7/20* (2013.01); *F16B 2/06* (2013.01); *F16F 1/16* (2013.01); *F16F 15/063* (2013.01); *B64D 2027/262* (2013.01); *F05D 2260/36* (2013.01); *Y02T 50/672* (2013.01)

(58) Field of Classification Search
CPC ........ B64D 27/26; B64D 27/00; B64D 27/12; B64D 2027/26; B64D 2027/266; B64D 2027/268

See application file for complete search history.

(56) References Cited

U.S. PATENT DOCUMENTS

| | | |
|---|---|---|
| 1,815,442 A | 7/1931 | Masury |
| 1,860,444 A | 5/1932 | Woolson |
| 2,028,549 A | 1/1936 | Lord |
| 2,523,504 A | 9/1950 | Ford, Jr. |
| 2,715,508 A | 8/1955 | Small, Jr. |

(Continued)

*Primary Examiner* — Philip J Bonzell
*Assistant Examiner* — Tye William Abell
(74) *Attorney, Agent, or Firm* — Lawrence Youst PLLC

(57) ABSTRACT

An engine mount assembly for coupling an engine to an airframe. The engine mount assembly includes a torsion bar coupled between the engine and the airframe. The torsion bar includes an external spline. The engine mount assembly also includes a bell crank having a clamp forming an internal spline with the internal spline of the bell crank adapted to mate with the external spline of the torsion bar to secure the bell crank to the torsion bar such that the bell crank rotates with the torsion bar responsive to movements of the engine.

20 Claims, 16 Drawing Sheets

(56) References Cited

U.S. PATENT DOCUMENTS

| | | | |
|---|---|---|---|
| 2,722,391 | A | 11/1955 | Kreighoff |
| 2,724,948 | A | 11/1955 | Hiscock et al. |
| 3,288,404 | A | 11/1966 | Schmidt et al. |
| 3,318,554 | A | 5/1967 | Ward et al. |
| 3,836,100 | A | 9/1974 | Von Hardenberg et al. |
| 3,844,115 | A | 10/1974 | Freid |
| 4,013,246 | A | 3/1977 | Nightingale |
| 4,097,011 | A | 6/1978 | White |
| 4,111,386 | A | 9/1978 | Kenigsberg et al. |
| 4,725,019 | A | 2/1988 | White |
| 4,742,975 | A * | 5/1988 | Pachomoff ............ B64D 27/26 244/54 |
| 5,806,792 | A * | 9/1998 | Brossier ................ B64D 27/18 244/54 |
| 8,646,724 | B2 * | 2/2014 | Bonnet ................ B64D 27/26 188/378 |
| 2012/0012732 | A1 * | 1/2012 | Zameroski ............ B64D 27/26 248/638 |
| 2015/0360788 | A1 * | 12/2015 | Hellegouarch ........ B64D 27/26 244/54 |
| 2018/0281980 | A1 * | 10/2018 | Riviere ................ B64D 27/10 |

* cited by examiner

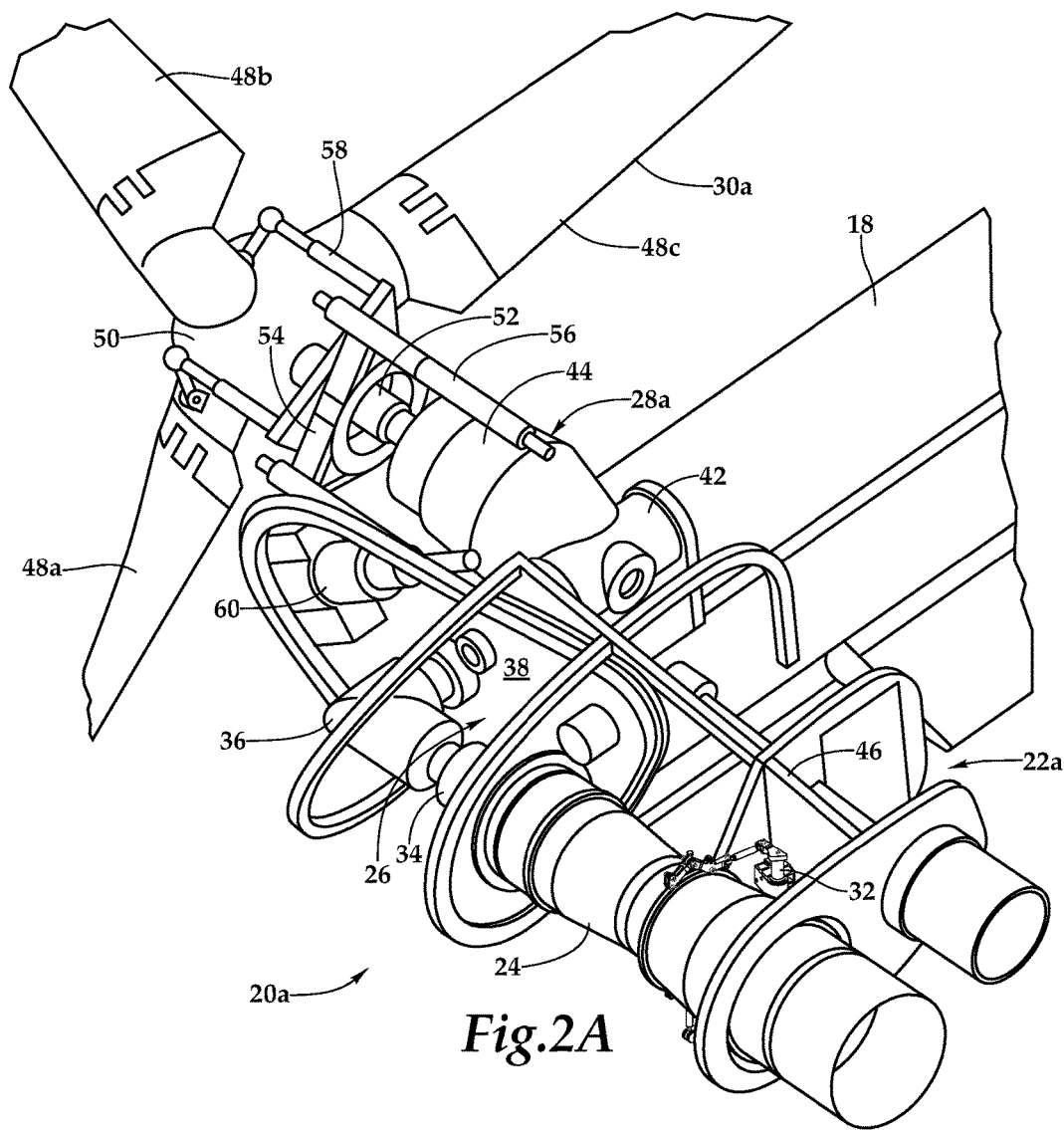
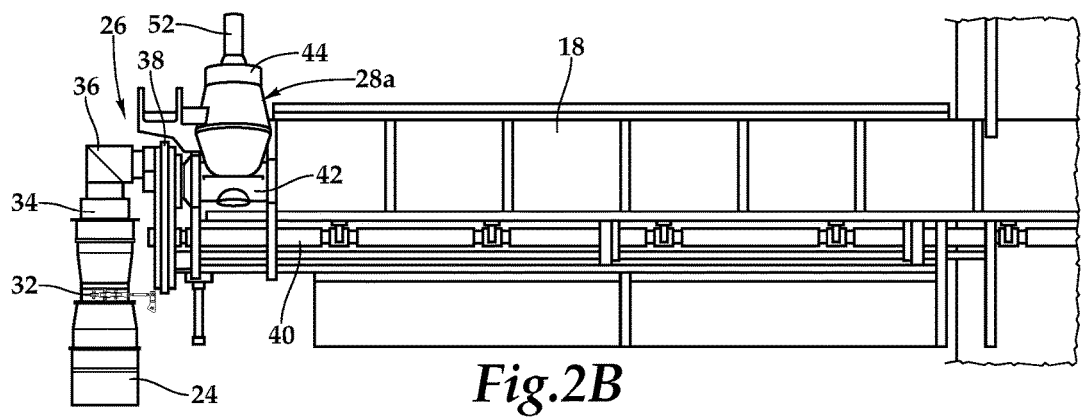

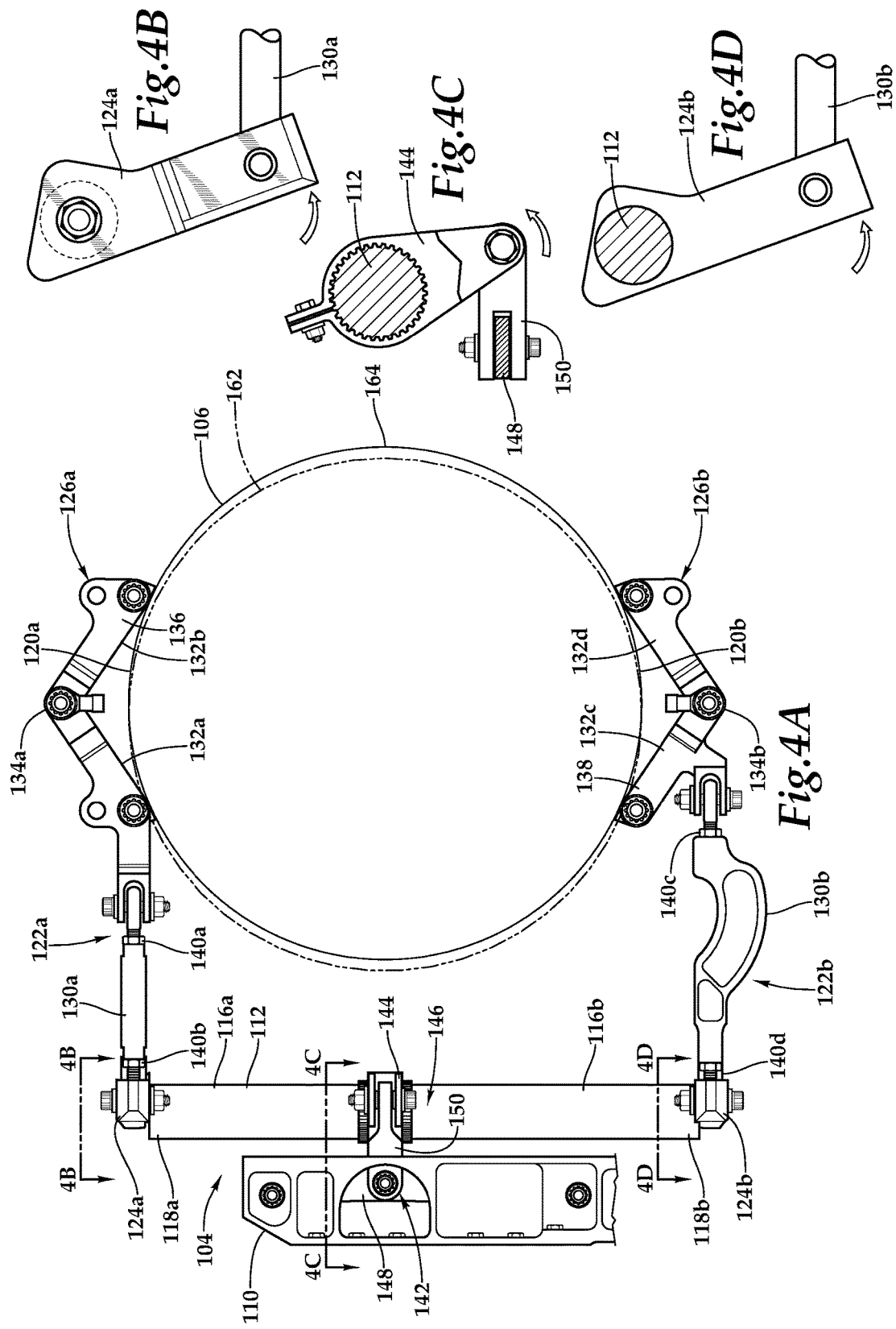

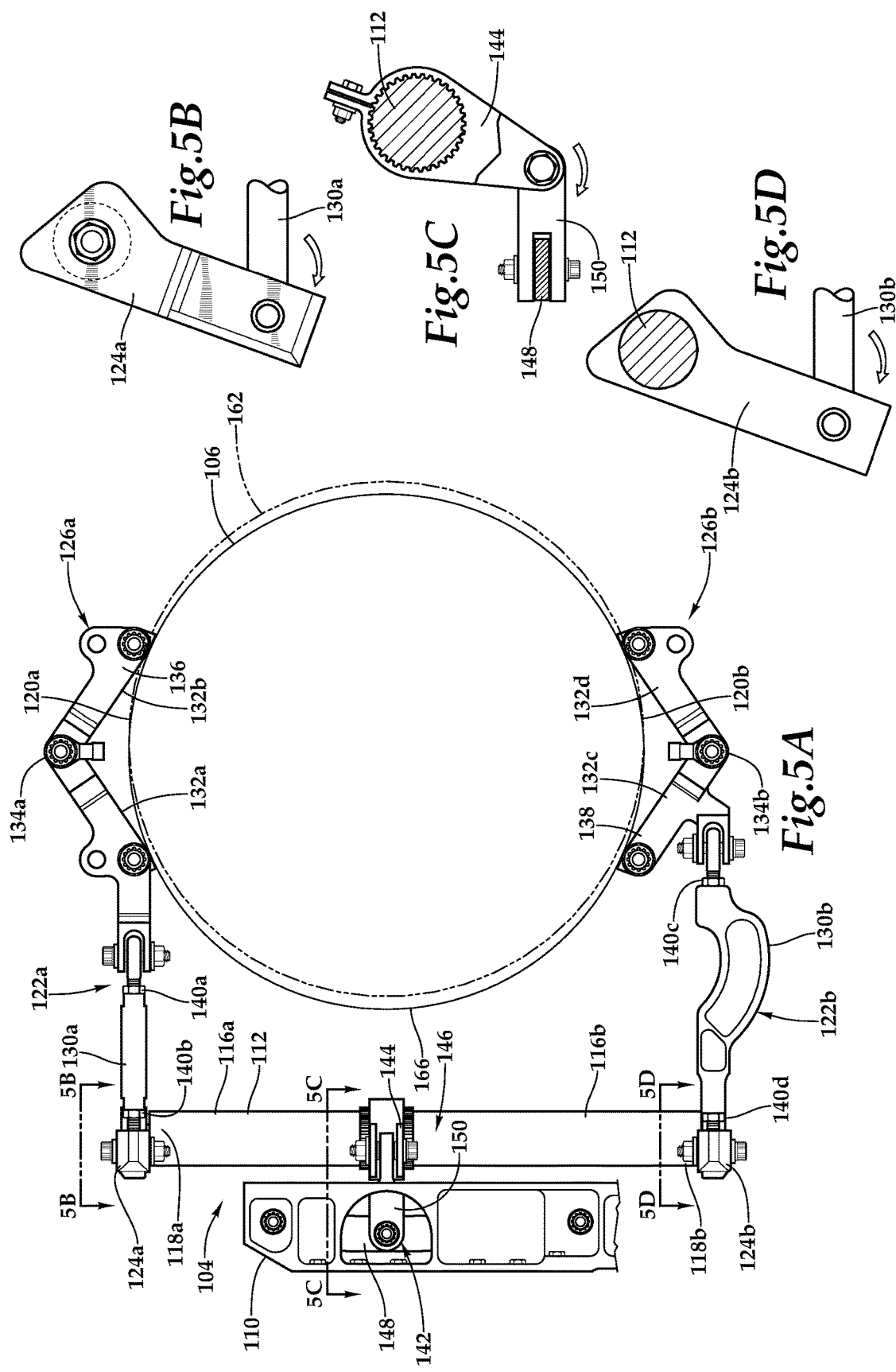

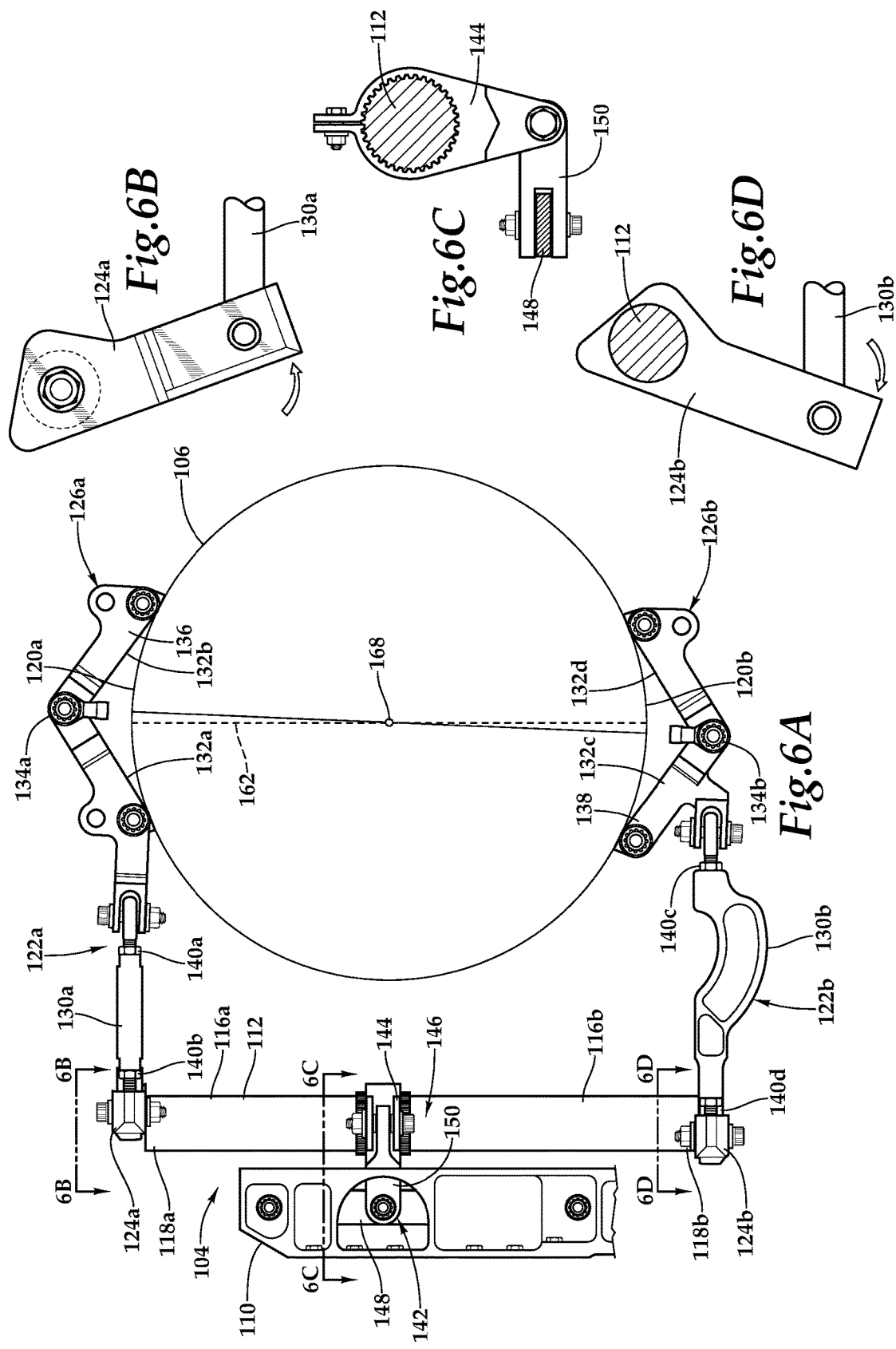

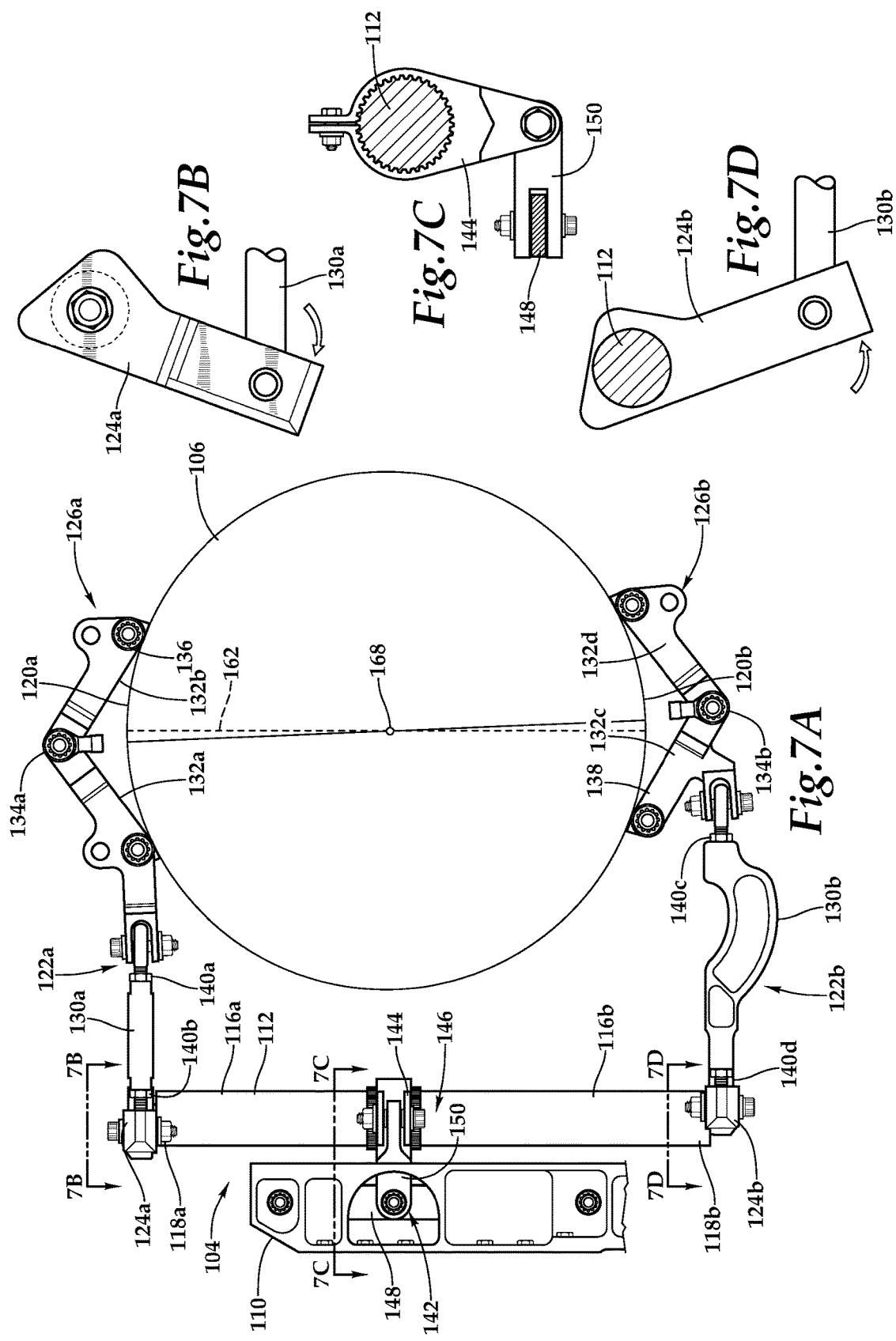

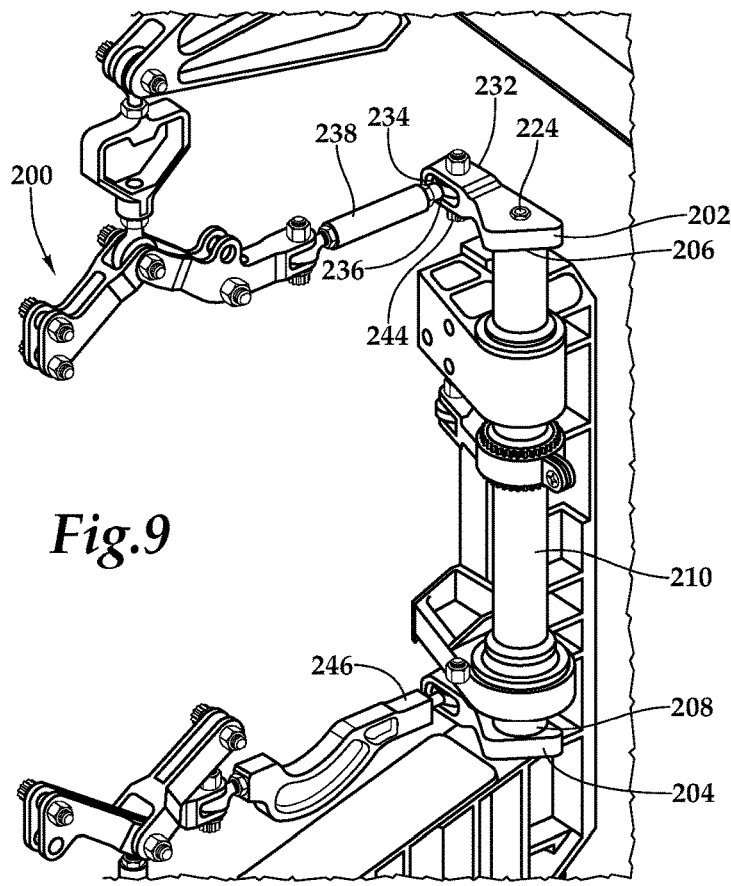
*Fig.9*
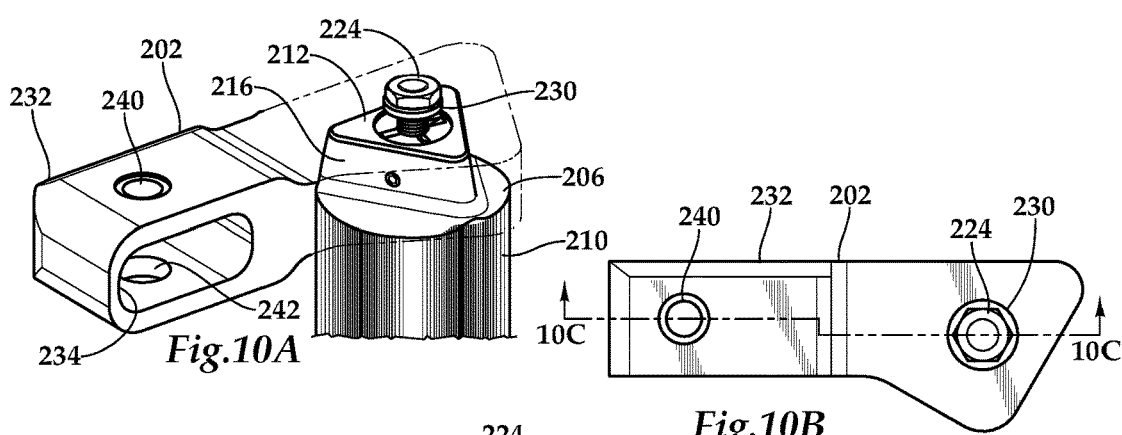
*Fig.10A* *Fig.10B*
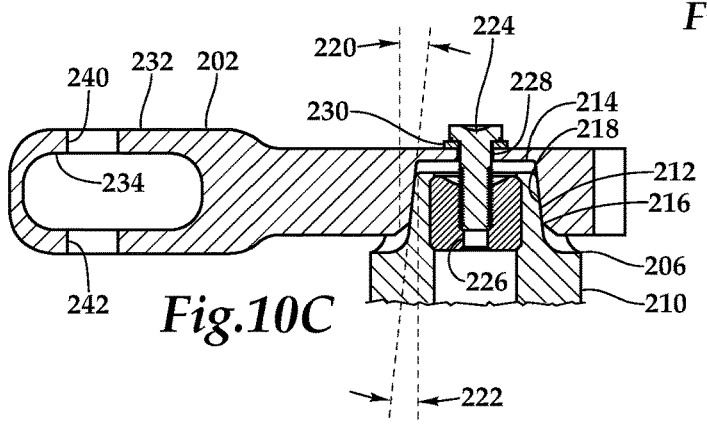
*Fig.10C*
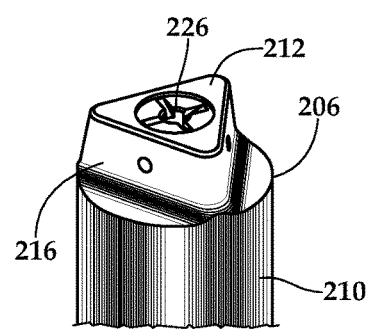
*Fig.10D*

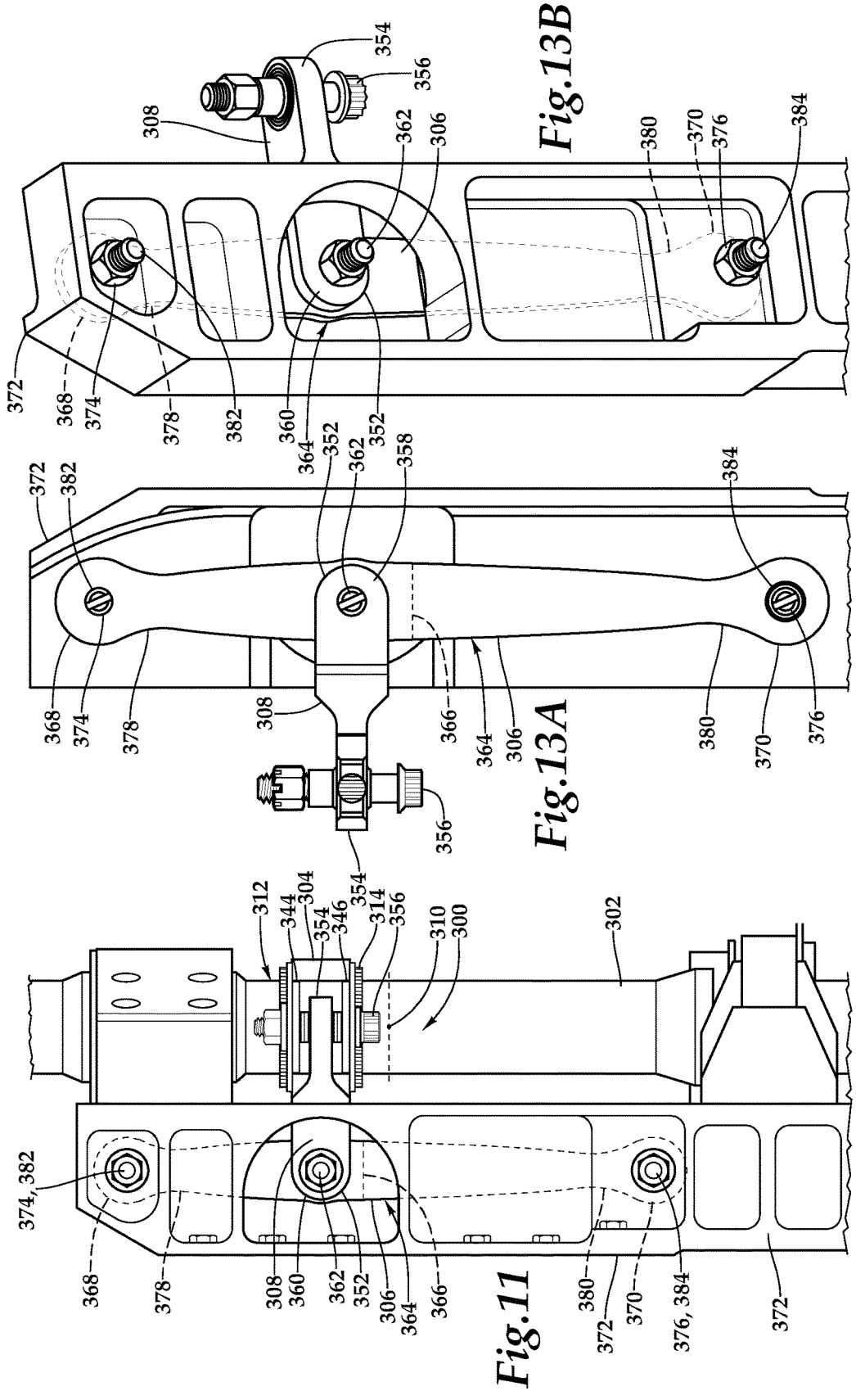

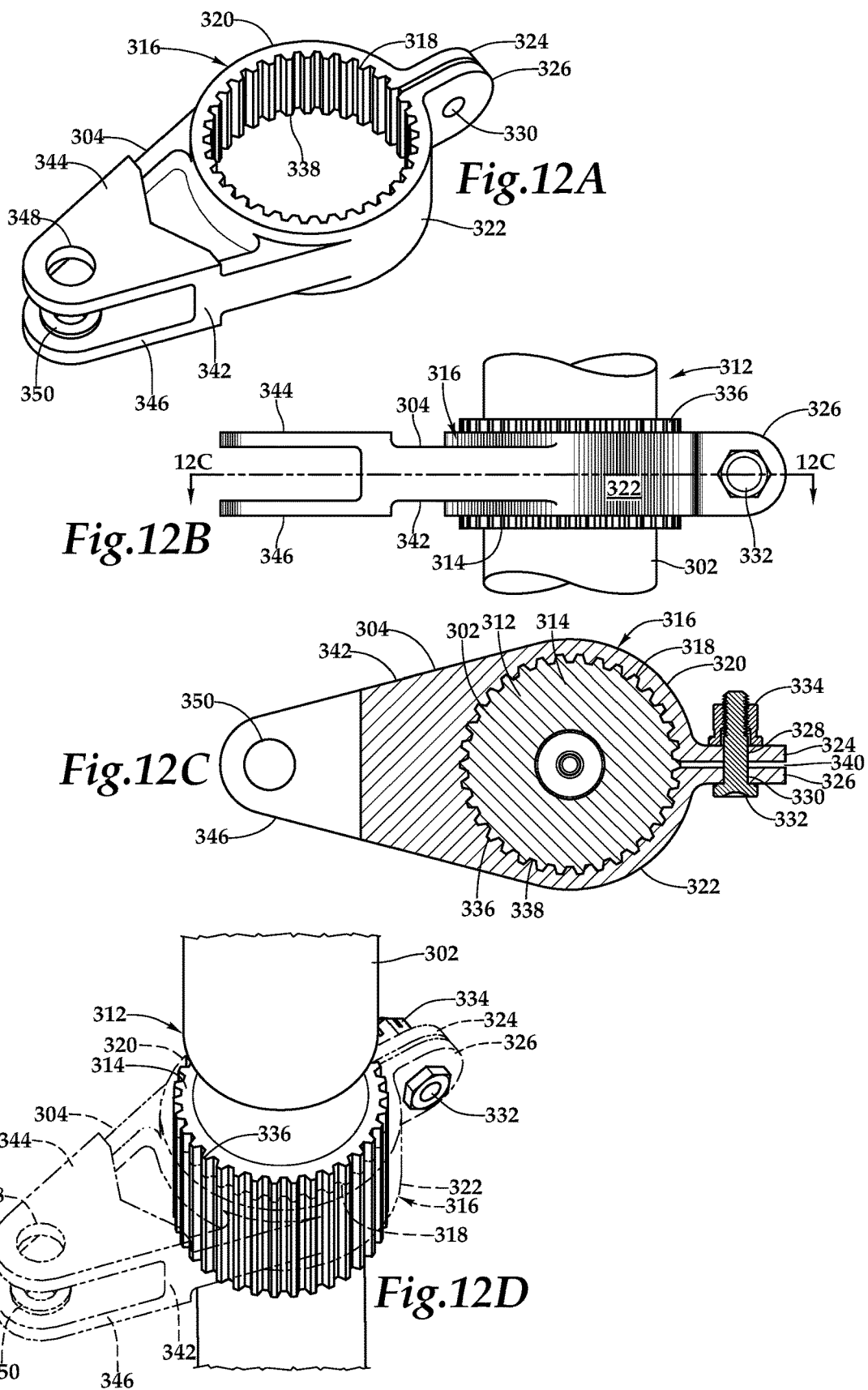

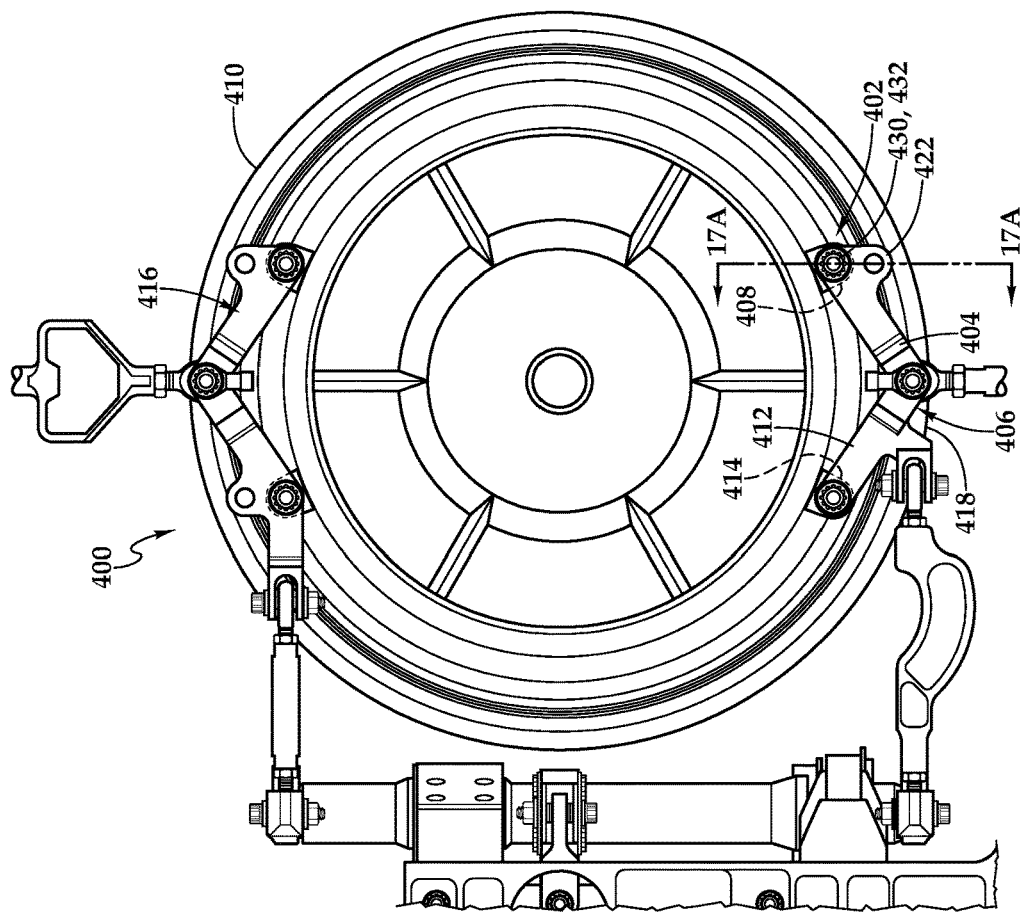
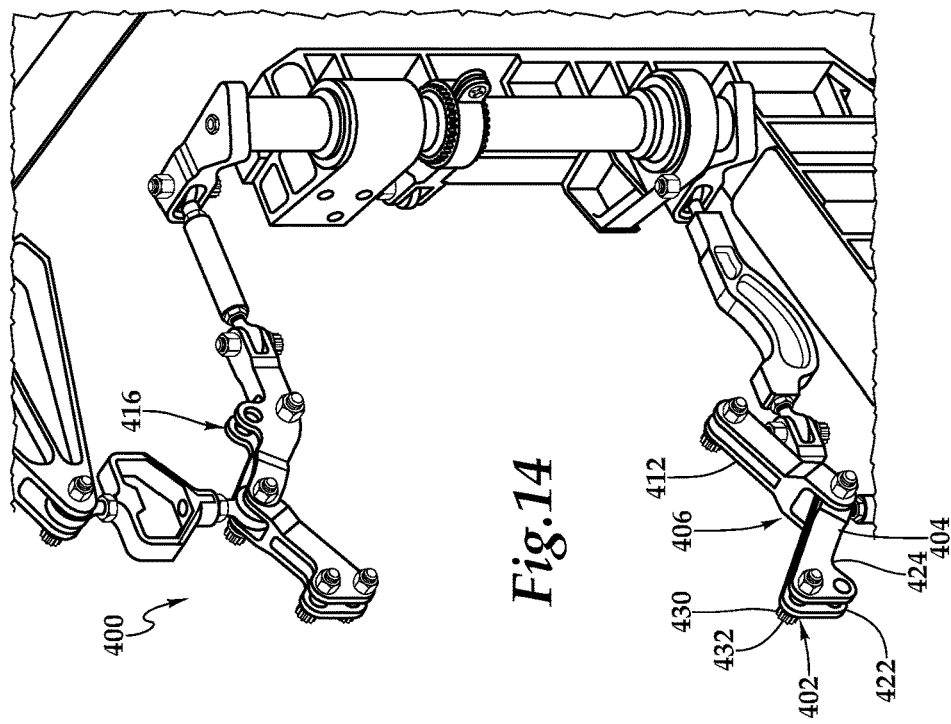

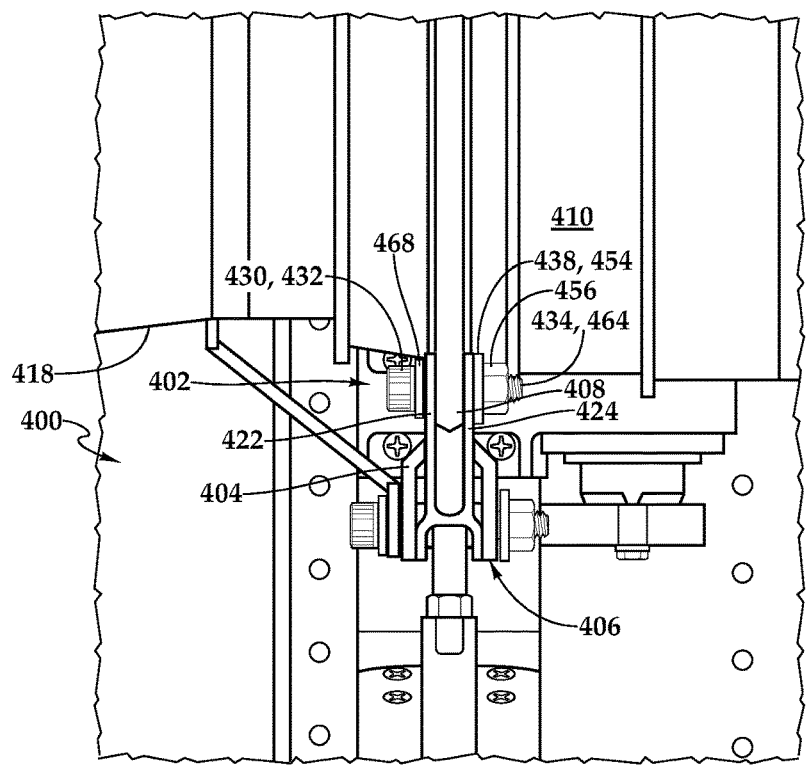
*Fig.16*
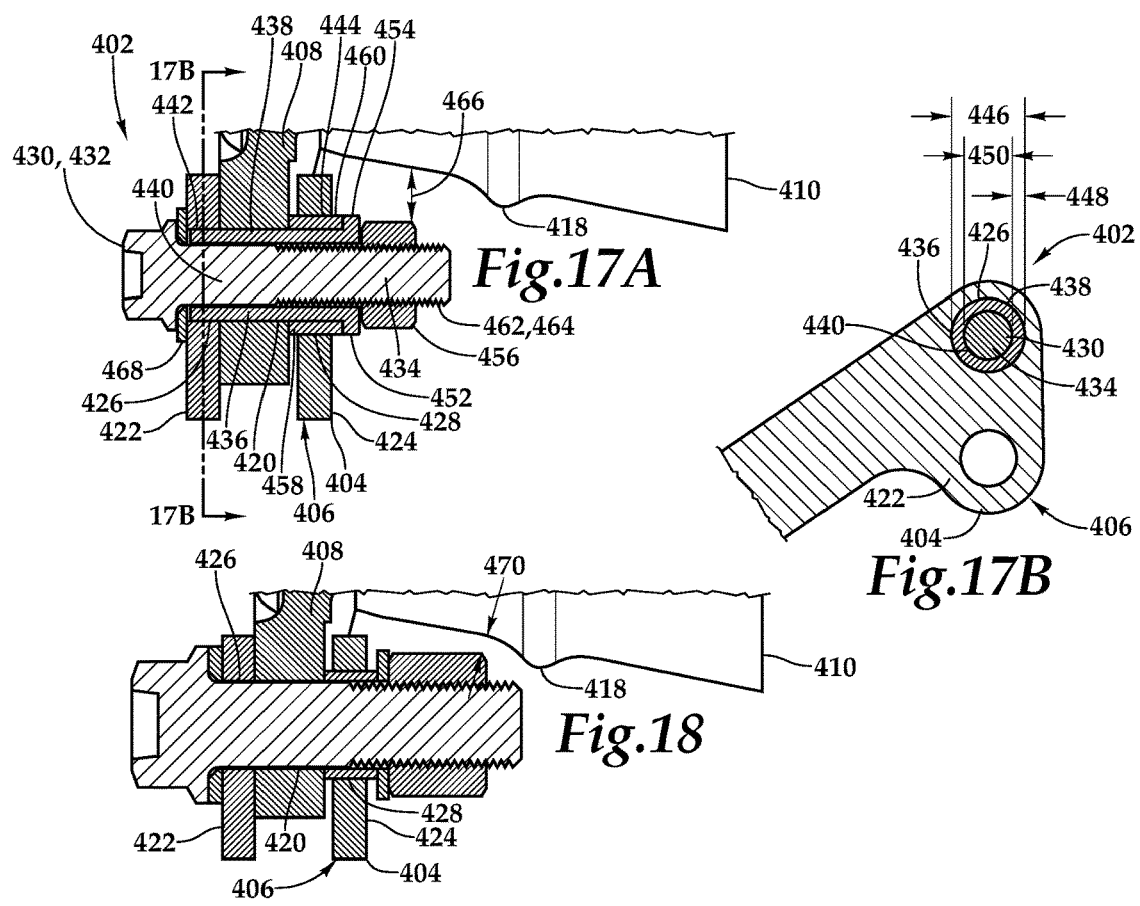
*Fig.17A*
*Fig.17B*
*Fig.18*

CLAMPED SPLINES FOR AIRCRAFT ENGINE MOUNT ASSEMBLIES

CROSS-REFERENCE TO RELATED APPLICATIONS

The present application claims the benefit of U.S. Provisional Application No. 62/289,766, filed Feb. 1, 2016, the contents of which are hereby incorporated by reference.

TECHNICAL FIELD OF THE DISCLOSURE

The present disclosure relates, in general, to engine mount assemblies for use on aircraft and, in particular, to engine mount assemblies for controlling engine motion or vibration along various degrees of freedom.

BACKGROUND

An aircraft may have one or more engines that are secured within or against another portion of the aircraft, such as a nacelle or airframe. Due to their large size, power output and other characteristics, aircraft engines may move or vibrate during operation. Engine mounts, in addition to securing engines on an aircraft, can be used to control or absorb an engine's vibrations to prevent structural instability during flight. Such instability may occur on rotorcraft, for example, if the rotor and associated engine have conflicting modes of vibration. Further complicating matters, engines may vibrate along multiple degrees of freedom at different respective magnitudes, including movement in the lateral, vertical and torsional directions. Load, motion, spatial and other operational constraints may require engine movement to be tuned or controlled in the vertical, lateral, and torsional directions. Current engine mounts, however, fail to allow for an engine's movement along the various degrees of freedom to be independently controlled. For example, current engine mounts may have stiffness in the torsional direction and stiffness in the lateral direction that are coupled to one another such that changing the stiffness in the torsional direction affects the stiffness in the lateral direction, or vice versa, making lateral and torsional engine movement difficult or impossible to independently control. Accordingly, a need has arisen for engine mounts that allow motion or vibration along the various degrees of motion of an engine to be independently tuned.

SUMMARY

In a first aspect, the present disclosure is directed to an engine mount assembly for coupling an engine to an airframe. The engine mount assembly includes a torsion bar and a crack. The torsion bar is coupled between the engine and the airframe and includes an external spline. The bell crank include a clamp forming an internal spline that is adapted to mate with the external spline of the torsion bar to secure the bell crank to the torsion bar such that the bell crank rotates with the torsion bar responsive to movements of the engine.

In some embodiments, the clamp may include first and second branches each forming a portion of the internal spline. In certain embodiments, the first and second branches each may include a securing tab, the securing tabs pressable toward one another to secure the clamp to the torsion bar. In some embodiments, the securing tabs each may include an aperture and the engine mount assembly may include a bolt insertable into the apertures of the securing tabs and a nut adapted to thread onto the bolt to secure the clamp to the torsion bar. In certain embodiments, the engine mount assembly may include a shim insertable between the securing tabs to control a distance between the securing tabs. In some embodiments, the bell crank may include a bell crank arm including first and second tines, the first and second tines each including an aperture. In certain embodiments, the external spline may include a plurality of outward-facing teeth, the internal spline may include a plurality of inward-facing teeth and the plurality of inward-facing teeth may be adapted to mate with the plurality of outward-facing teeth. In some embodiments, the plurality of outward-facing teeth may be substantially parallel and the plurality of inward-facing teeth may be substantially parallel. In certain embodiments, the plurality of outward-facing teeth may include a plurality of flat-topped teeth and the plurality of inward-facing teeth may include a plurality of flat-topped teeth. In some embodiments, the external spline may be located proximate the middle section of the torsion bar and/or may be offset a distance from the midpoint of the torsion bar. In some embodiments, the middle section of the torsion bar may have a reduced diameter adjacent to the external spline.

In certain embodiments, the engine may be subject to lateral movement causing the torsion bar to rotate, the bell crank may include a middle bell crank and the middle bell crank may rotate in response to rotation of the torsion bar caused by lateral movement of the engine. In some embodiments, the middle bell crank may include a bell crank arm and the engine mount assembly may include a beam spring coupled to the bell crank arm, the beam spring having a lateral stiffness to resist rotation of the middle bell crank. In such embodiments, lateral movement of the engine may be controllable based on the lateral stiffness of the beam spring. In some embodiments, the engine may be subject to torsional movement causing the torsion bar to experience torsion and the bell crank may be substantially stationary in response to torsion of the torsion bar caused by torsional movement of the engine. In certain embodiments, the bell crank may be formed from a metal such as steel. In some embodiments, the engine may be subject to lateral movement and the engine mount assembly may include a lateral movement control assembly coupled to the torsion bar and having a lateral stiffness, the lateral movement control assembly including the bell crank. In such embodiments, the torsion bar and the bell crank may rotate in response to lateral movement of the engine such that lateral movement of the engine is controllable based on the lateral stiffness of the lateral movement control assembly. In certain embodiments, the lateral movement control assembly may include a spring coupled to the bell crank, the spring having the lateral stiffness.

In a second aspect, the present disclosure is directed to a rotorcraft including an airframe, an engine and an engine mount assembly adapted to mount the engine to the airframe. The engine mount assembly includes a torsion bar having an external spline and a bell crank including a clamp forming an internal spline that is adapted to mate with the external spline of the torsion bar to secure the bell crank to the torsion bar such that the bell crank rotates with the torsion bar responsive to movements of the engine.

In a third aspect, the present disclosure is directed to a tiltrotor aircraft having a helicopter mode and an airplane mode. The tiltrotor aircraft includes an airframe including a fuselage, a wing and a nacelle. An engine is disposed within the nacelle. An engine mount assembly is adapted to mount the engine to the airframe. The engine mount assembly includes a torsion bar having an external spline and a bell crank including a clamp forming an internal spline that is adapted to mate with the external spline of the torsion bar to secure the bell crank to the torsion bar such that the bell crank rotates with the torsion bar responsive to movements of the engine.

BRIEF DESCRIPTION OF THE DRAWINGS

For a more complete understanding of the features and advantages of the present disclosure, reference is now made to the detailed description along with the accompanying schematic figures in which corresponding numerals in the different figures refer to corresponding parts and in which:

FIG. 2A is an isometric view of an exemplary propulsion system for a tiltrotor aircraft utilizing an engine mount assembly in accordance with embodiments of the present disclosure;

FIG. 2B is a top view of an exemplary wing section of a tiltrotor aircraft that includes an engine mount assembly in accordance with embodiments of the present disclosure;

FIGS. 4A-4D and 5A-5D are various views of an engine mount assembly responding to lateral movement of an engine in accordance with embodiments of the present disclosure;

FIGS. 6A-6D and 7A-7D are various views of an engine mount assembly responding to torsional movement of an engine in accordance with embodiments of the present disclosure;

FIGS. 9 and 10A-10D are various views of an end bell crank of an engine mount assembly in accordance with embodiments of the present disclosure;

FIG. 11 is a front view of a lateral movement control assembly of an engine mount assembly in accordance with embodiments of the present disclosure;

FIGS. 12A-12D are various views of a middle bell crank of an engine mount assembly in accordance with embodiments of the present disclosure;

FIGS. 13A-13B are various views of a beam spring of an engine mount assembly in accordance with embodiments of the present disclosure;

FIGS. 14-16 and 17A-17B are various views of a sleeved bolt assembly of an engine mount assembly in accordance with embodiments of the present disclosure; and FIG. 18 is a cross-sectional view of a traditional bolt assembly.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
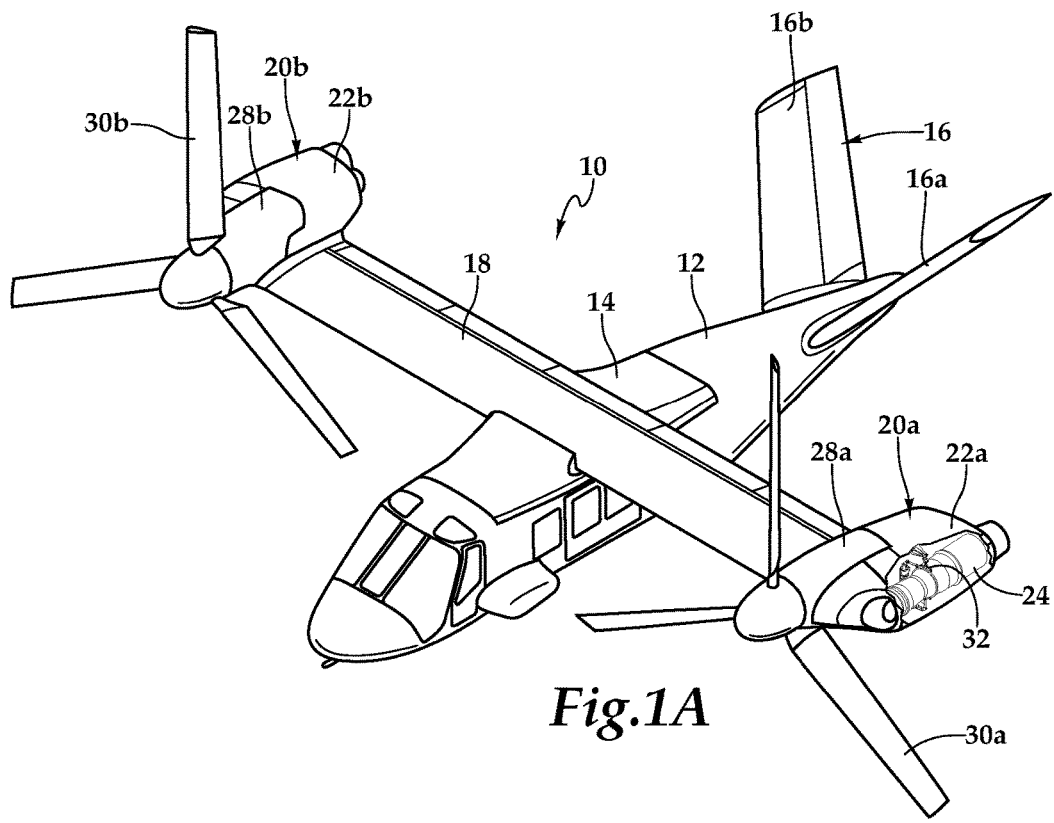
FIGS. 1A-1B are schematic illustrations of a tiltrotor aircraft utilizing engine mount assemblies in accordance with embodiments of the present disclosure.
Figure 1B:
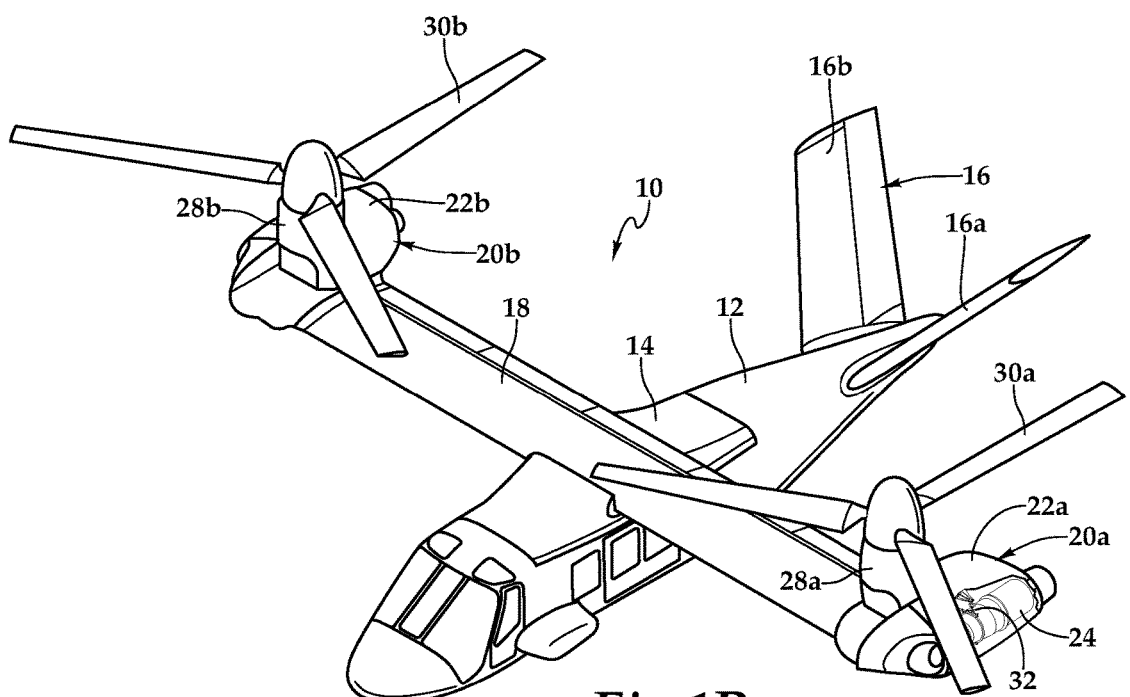
Figure 3A:
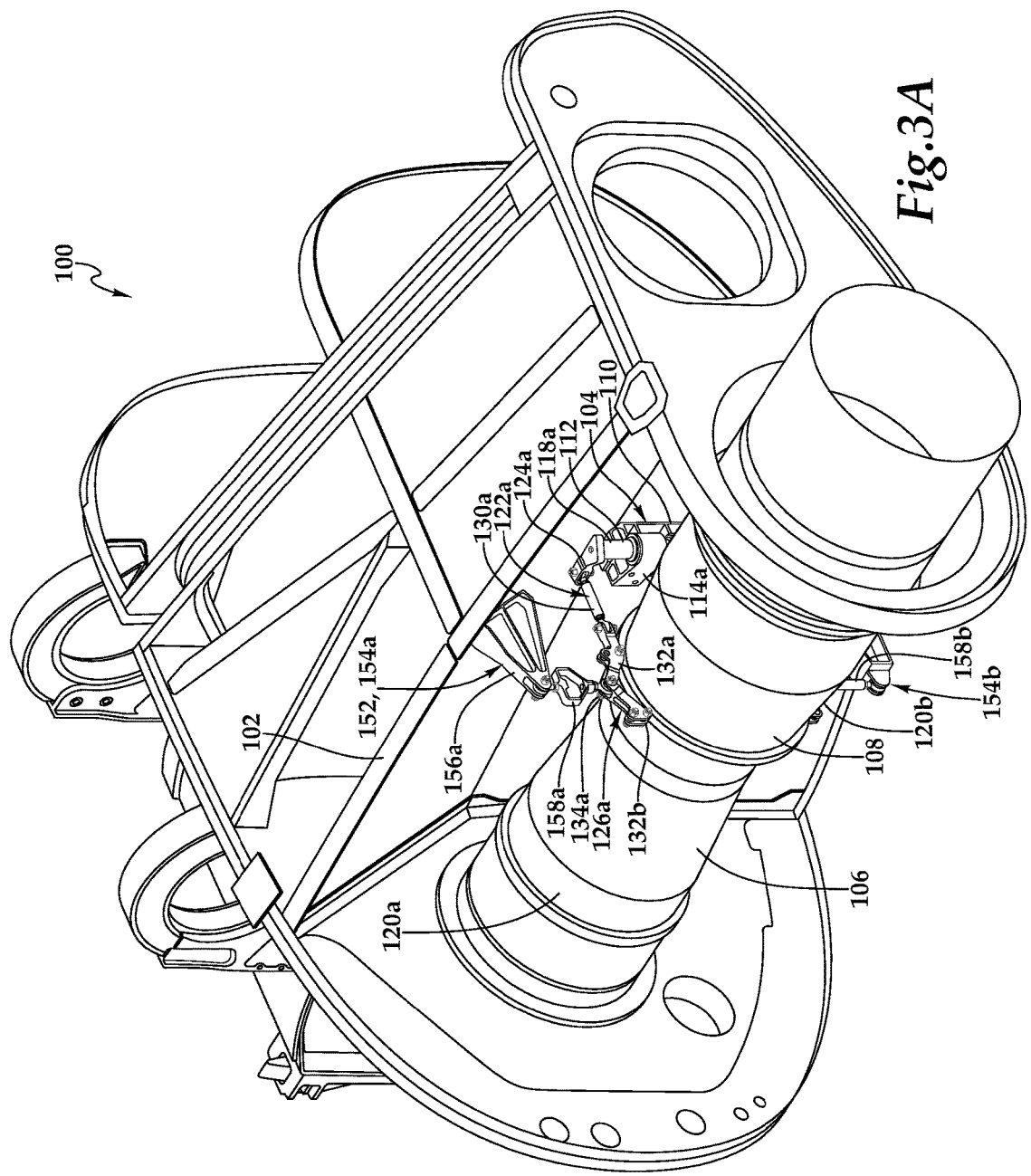
FIG. 3A is an isometric view of a fixed pylon in which an engine is mounted using an engine mount assembly in accordance with embodiments of the present disclosure.
Figure 3B:
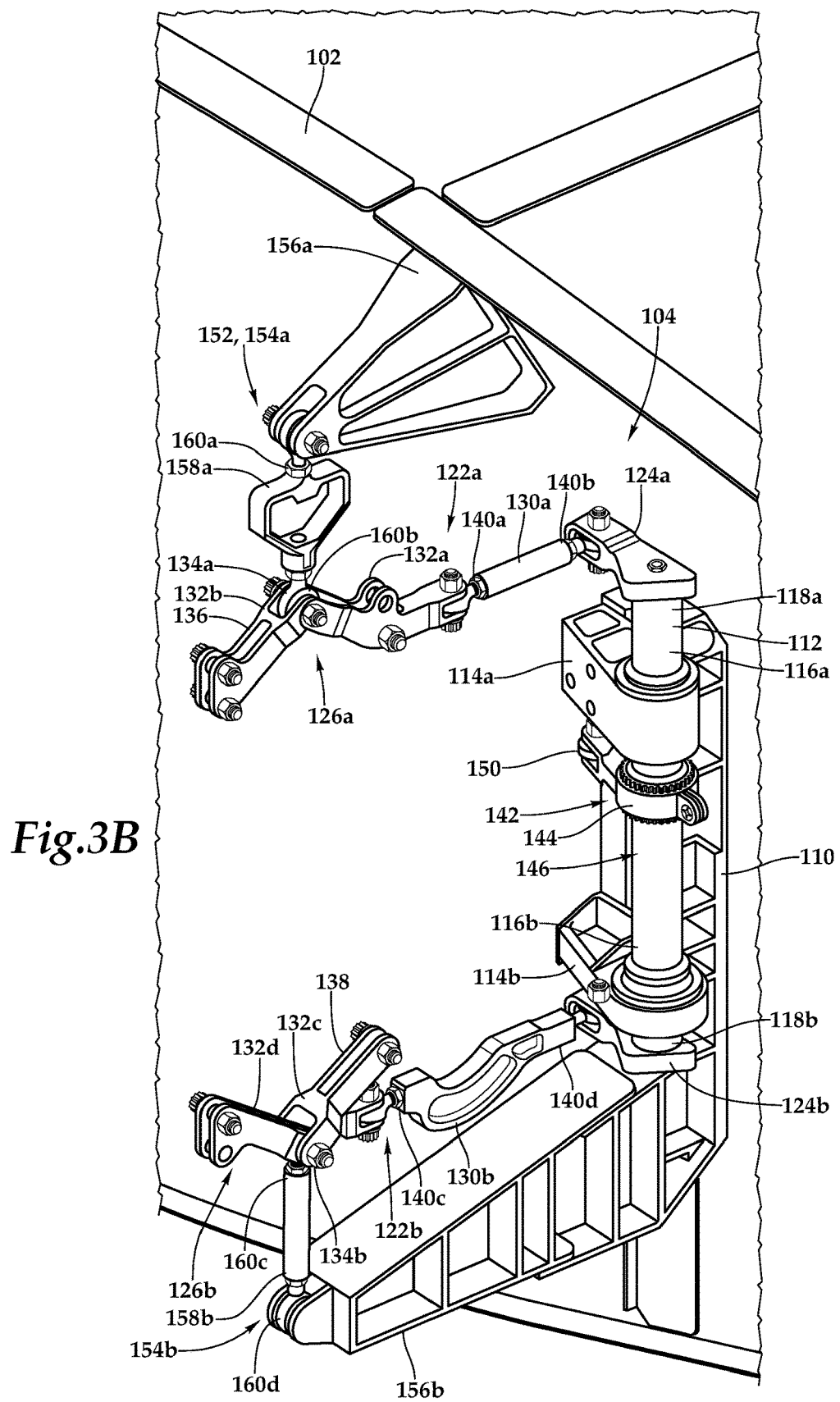
FIGS. 3B-3D are various views of an engine mount assembly in accordance with embodiments of the present disclosure.
Figure 3C:
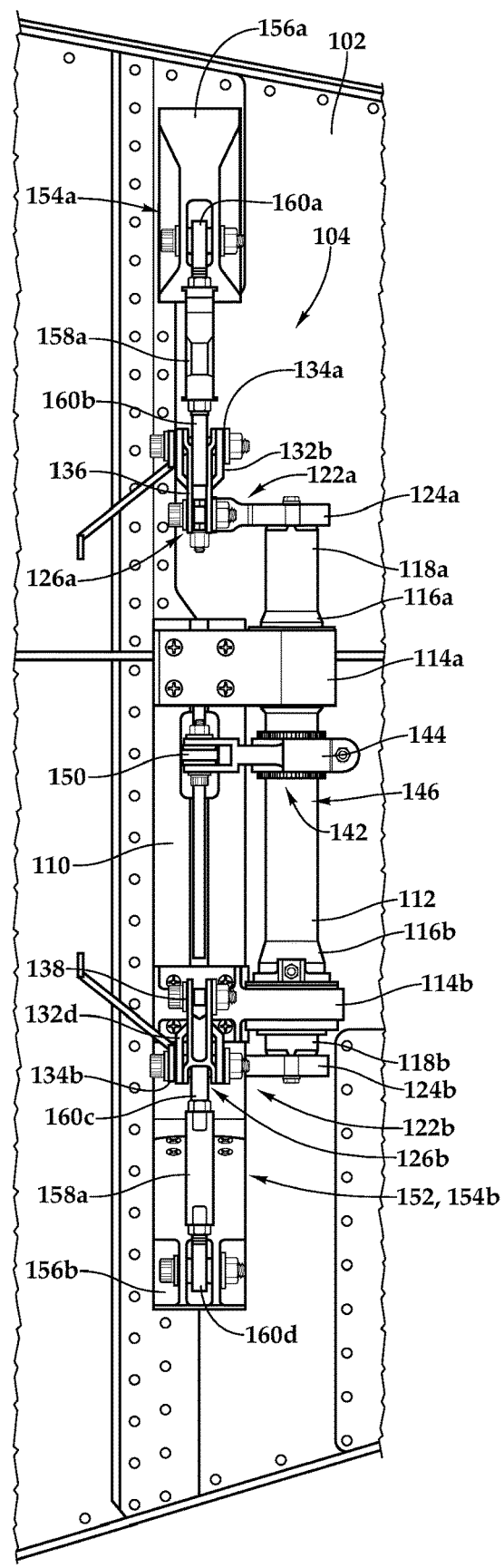
Figure 3D:
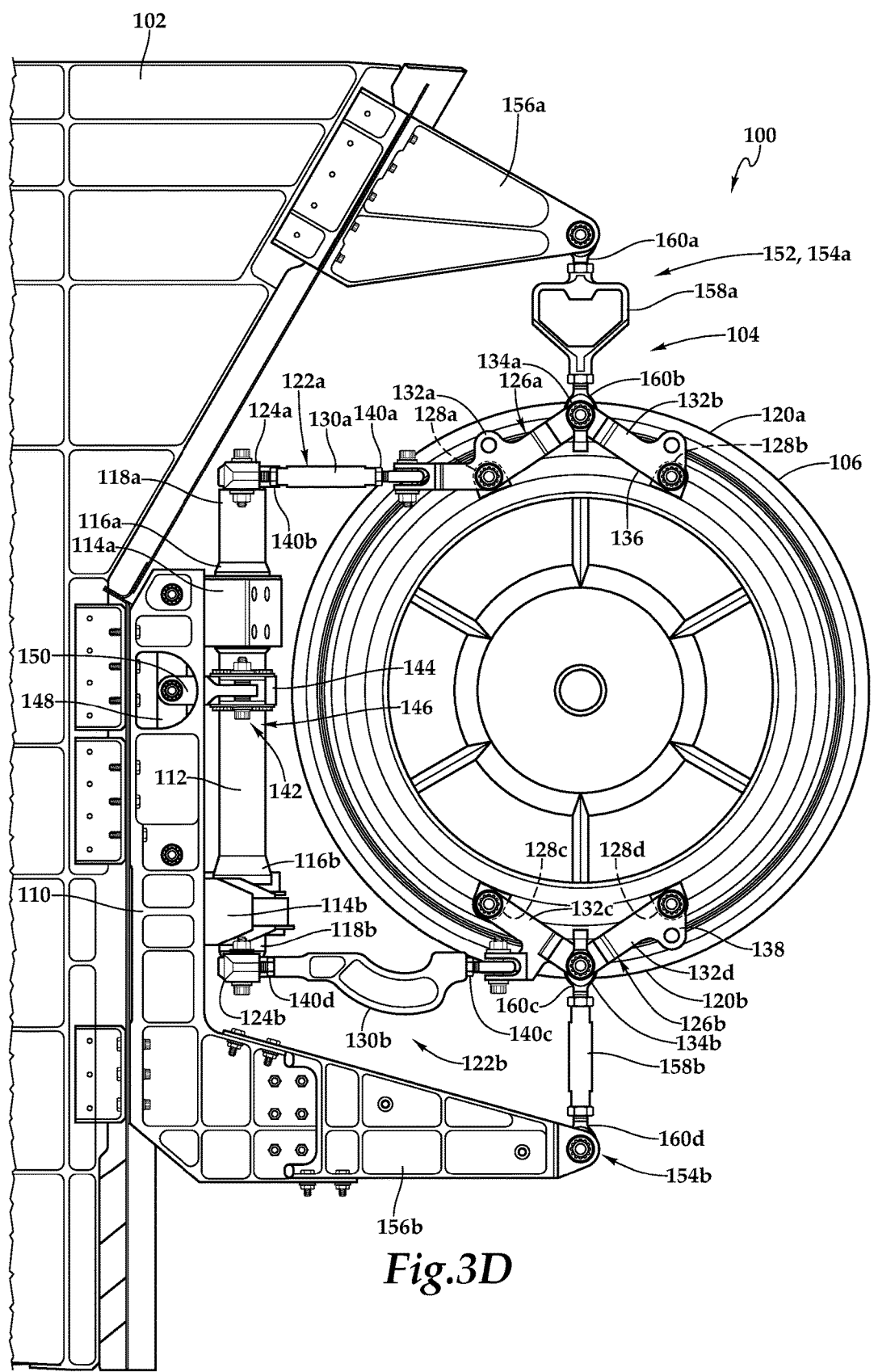

Referring to FIGS. 1A-1B and 2A-2B in the drawings, a tiltrotor aircraft is schematically illustrated and generally designated 10. Aircraft 10 includes a fuselage 12, a wing mount assembly 14 and a tail assembly 16 including rotatably mounted tail members 16a, 16b having control surfaces operable for horizontal and/or vertical stabilization during forward flight. A wing member 18 is supported by wing mount assembly 14. Located at outboard ends of wing member 18 are propulsion assemblies 20a, 20b. Propulsion assembly 20a includes a nacelle depicted as fixed pylon 22a that houses an engine 24 and a transmission 26. Thus, the nacelle is fixed relative to wing member 18. In addition, propulsion assembly 20a includes a mast assembly 28a that is rotatable relative to fixed pylon 22a between a generally horizontal orientation, as best seen in FIG. 1A, and a generally vertical orientation, as best seen in FIG. 1B. Propulsion assembly 20a also includes a proprotor assembly 30a that is rotatable relative to mast assembly 28a responsive to torque and rotational energy provided via a rotor hub assembly and drive system mechanically coupled to engine 24 and transmission 26. Similarly, propulsion assembly 20b includes a nacelle depicted as fixed pylon 22b that houses an engine and transmission, a mast assembly 28b that is rotatable relative to fixed pylon 22b and a proprotor assembly 30b that is rotatable relative to mast assembly 28b responsive to torque and rotational energy provided via a rotor hub assembly and drive system mechanically coupled to the engine and transmission housed by fixed pylon 22b. As used herein, including in the claims, the term "coupled" may include direct or indirect coupling by any means, including moving and/or non-moving mechanical connections.

FIG. 1A illustrates aircraft 10 in airplane or forward flight mode, in which proprotor assemblies 30a, 30b are rotating in a substantially vertical plane to provide a forward thrust enabling wing member 18 to provide a lifting force responsive to forward airspeed, such that aircraft 10 flies much like a conventional propeller driven aircraft. Unless otherwise indicated, as used herein, "or" does not require mutual exclusivity. FIG. 1B illustrates aircraft 10 in helicopter or vertical takeoff and landing (VTOL) flight mode, in which proprotor assemblies 30a, 30b are rotating in a substantially horizontal plane to provide a lifting thrust, such that aircraft 10 flies much like a conventional helicopter. It should be appreciated that aircraft 10 can be operated such that proprotor assemblies 30a, 30b are selectively positioned between forward flight mode and VTOL flight mode, which can be referred to as a conversion flight mode. Even though aircraft 10 has been described as having one engine in each fixed pylon 22a, 22b, it should be understood by those having ordinary skill in the art that other engine arrangements are possible and are considered to be within the scope of the present disclosure including, for example, having a single engine which may be housed within fuselage 12 that provides torque and rotational energy to both proprotor assemblies 30a, 30b.

Engine 24 is mounted within fixed pylon 22a by engine mount assembly 32. Engine mount assembly 32 may be mounted onto an aft portion of engine 24, as illustrated. Engine 24 is subject to movement, including vibration, in multiple directions, or degrees of freedom, including the lateral, vertical and torsional directions. When engine 24 vibrates at particular frequencies, structural instability of fixed pylon 22a or another portion of aircraft 10 can result. For example, structural instability can result if engine 24 vibrates at an excitation frequency originating from proprotor assembly 30a. Engine mount assembly 32 controls movement, including vibration frequencies, of engine 24 by tailoring the stiffness of various constituent structures or components to counteract the movement of engine 24 in the lateral, vertical and torsional directions. Furthermore, engine mount assembly 32 is capable of independently controlling the movement of engine 24 in any one direction, while not affecting the movement of engine 24 in any other direction, thereby decoupling control of the lateral, vertical and torsional movement of engine 24 from each other. For example, engine mount assembly 32 is capable of increasing the stiffness working against the lateral movement of engine 24 without affecting the stiffness working against the torsional movement of engine 24, or vice versa. Such independent control allows engine mount assembly 32 to, for example, more easily meet operational vibration ranges or targets of engine 24 in each of the lateral, vertical and torsional directions. Engine mount assembly 32 provides the capability of controlling stiffness in the lateral, vertical and torsional load directions to tailor dynamic tuning of engine 24, and thus achieve reductions in oscillatory loading and vibration.

Referring now to FIGS. 2A-2B, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Engine 24 of propulsion assembly 20a is substantially fixed relative to wing 18, although some motion of engine 24 occurs during operation. In particular, engine mount assembly 32 allows for the controlled motion of engine 24. An engine output shaft 34 transfers power from engine 24 to a spiral bevel gearbox 36 that includes spiral bevel gears to change torque direction by 90 degrees from engine 24 to a fixed gearbox 38 via a clutch. Fixed gearbox 38 includes a plurality of gears, such as helical gears, in a gear train that are coupled to an interconnect drive shaft 40 and a quill shaft (not visible) that supplies torque to an input in spindle gearbox 42 of proprotor gearbox 44. Interconnect drive shaft 40 provides a torque path that enables a single engine of aircraft 10 to provide torque to both proprotor assemblies 30a, 30b in the event of a failure of the other engine. In the illustrated embodiment, interconnect drive shaft 40 includes a plurality of segments that share a common rotational axis.

Engine 24 is housed and supported in fixed pylon 22a (see FIGS. 1A-1B) that may include features such as an inlet, aerodynamic fairings and exhaust, as well as other structures and systems to support and facilitate the operation of engine 24. The airframe of aircraft 10, which supports the various sections of aircraft 10 including fuselage 12, includes a propulsion assembly airframe section 46 that supports propulsion assembly 20a. Engine mount assembly 32 is coupled to propulsion assembly airframe section 46 to support engine 24. Proprotor assembly 30a of propulsion assembly 20a includes three rotor blades 48a, 48b, 48c that are coupled to a rotor hub 50. Rotor hub 50 is coupled to a mast 52 that is coupled to proprotor gearbox 44. Together, spindle gearbox 42, proprotor gearbox 44 and mast 52 are part of mast assembly 28a that rotates relative to fixed pylon 22a. In addition, it should be appreciated by those having ordinary skill in the art that mast assembly 28a may include different or additional components, such as a pitch control assembly depicted as swashplate 54, actuators 56 and pitch links 58, wherein swashplate 54 is selectively actuated by actuators 56 to selectively control the collective pitch and the cyclic pitch of rotor blades 48a, 48b, 48c via pitch links 58. A linear actuator, depicted as conversion actuator 60 of fixed pylon 22a, is operable to reversibly rotate mast assembly 28a relative to fixed pylon 22a, which in turn selectively positions proprotor assembly 30a between forward flight mode, in which proprotor assembly 30a is rotating in a substantially vertical plane, and VTOL flight mode, in which proprotor assembly 30a is rotating in a substantially horizontal plane.

It should be appreciated that aircraft 10 is merely illustrative of a variety of aircraft that can implement the embodiments disclosed herein. Indeed, engine mount assembly 32 may be utilized on any aircraft having one or more engines. Other aircraft implementations can include hybrid aircraft, tiltwing aircraft, quad tiltrotor aircraft, unmanned aircraft, gyrocopters, airplanes, jets, helicopters and the like. As such, those of ordinary skill in the art will recognize that engine mount assembly 32 can be integrated into a variety of aircraft configurations. It should be appreciated that even though aircraft are particularly well-suited to implement the embodiments of the present disclosure, non-aircraft vehicles and devices can also implement the embodiments, including, but not limited to, automobiles or land-based vehicles.

Figure 8B:
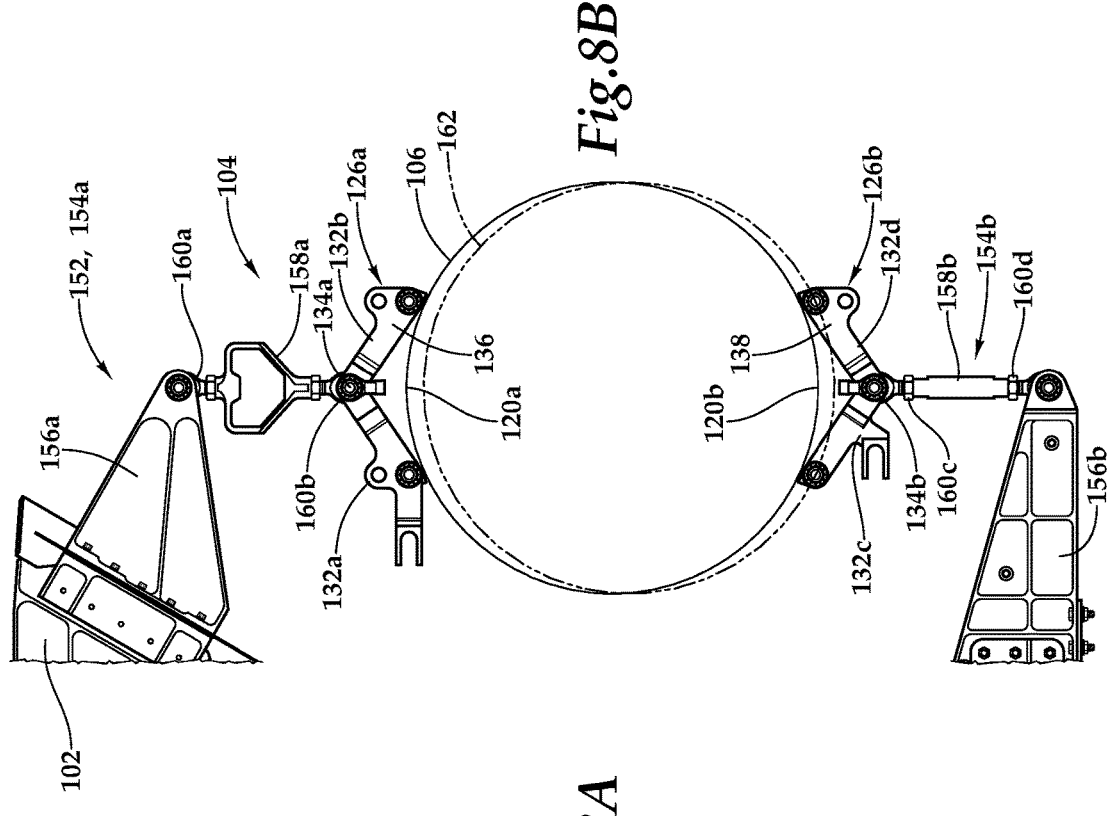
FIGS. 8A-8B are front views of an engine mount assembly responding to vertical movement of an engine in accordance with embodiments of the present disclosure.
Figure 8A:
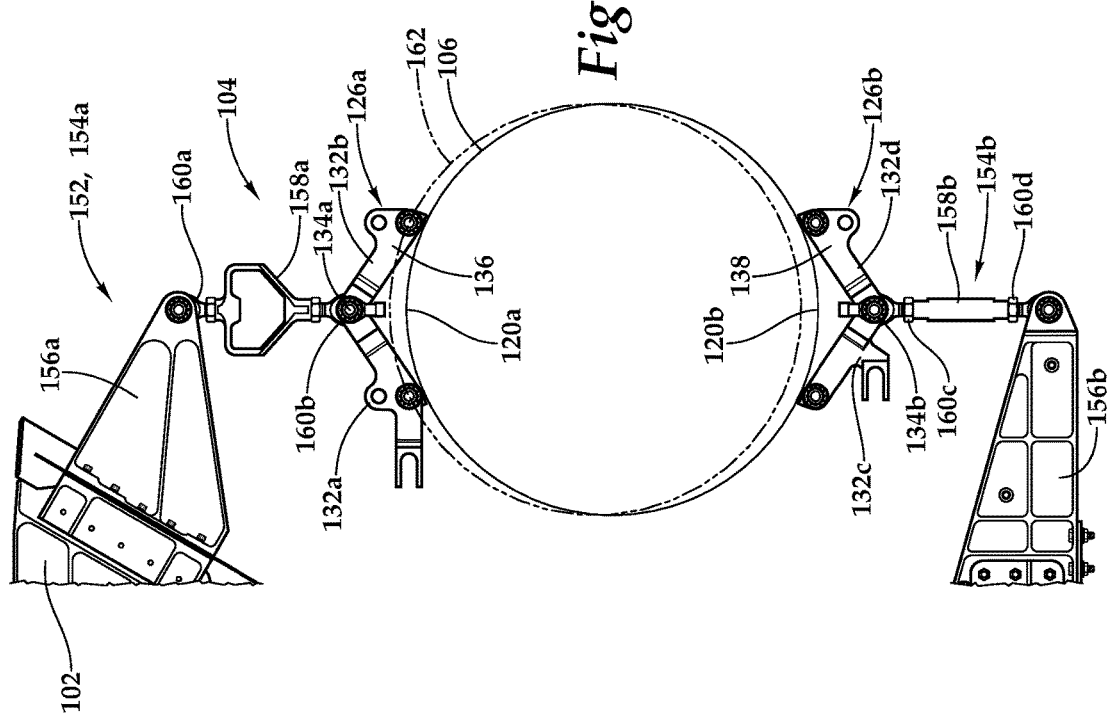

Referring to FIGS. 3A-3D, 4A-4D, 5A-5D, 6A-6D, 7A-7D and 8A-8B in the drawings, a propulsion assembly including an engine mount assembly is generally designated 100. Propulsion assembly 100 includes airframe 102. The illustrated portion of airframe 102 is a section of the airframe for the aircraft that supports propulsion assembly 100. Engine mount assembly 104 mounts engine 106 to airframe 102. In the illustrated embodiment, engine mount assembly 104 attaches to aft portion 108 of engine 106, although engine mount assembly 104, in other embodiments, may attach to any portion of engine 106. Engine 106 is subject to lateral movement, as shown in FIGS. 4A-4D and 5A-5D, torsional movement, as shown in FIGS. 6A-6D and 7A-7D, and vertical movement, as shown in FIGS. 8A-8B. Lateral, torsional and vertical movement includes, but is not limited to, lateral, torsional and vertical vibration, modes of vibration or other oscillatory motion, respectively. Engine mount assembly 104 is capable of independently tailoring stiffness along the lateral, torsional and vertical load paths of engine 106 to allow for independent control of the lateral, torsional and vertical movement of engine 106.

Engine mount assembly 104 includes a support spine 110 coupled to airframe 102. A torsion bar 112 is vertically mounted within propulsion assembly 100, and is rotatably coupled to support spine 110 by upper and lower torsion bar bearing mounts 114a, 114b. Upper and lower torsion bar bearing mounts 114a, 114b are rotatably coupled to upper and lower portions 116a, 116b of torsion bar 112, respectively, to permit axial rotation of torsion bar 112 about its longitudinal axis. The interface between torsion bar 112 and upper and lower torsion bar bearing mounts 114a, 114b may include bearings to facilitate the rotation of torsion bar 112. Upper and lower torsion bar bearing mounts 114a, 114b are fixedly coupled to support spine 110.

Torsion bar 112 is coupled to engine 106. When torsion bar 112 experiences torsion, torsion bar 112 has a torsional stiffness that is capable of independently controlling torsional movement of engine 106. Top and bottom ends 118a, 118b of torsion bar 112 are coupled to top and bottom sides 120a, 120b of engine 106 by top and bottom arm assemblies 122a, 122b, respectively. Top arm assembly 122a includes top end bell crank 124a fixedly coupled to top end 118a of torsion bar 112, a top scissor mount 126a coupled to top engine lugs 128a, 128b on top side 120a of engine 106 and a top linkage 130a coupling top end bell crank 124a to top scissor mount 126a. Bottom arm assembly 122b includes bottom end bell crank 124b fixedly coupled to bottom end 118b of torsion bar 112, bottom scissor mount 126b coupled to bottom engine lugs 128c, 128d on bottom side 120b of engine 106 and bottom linkage 130b coupling bottom end bell crank 124b to bottom scissor mount 126b. Loads caused by lateral and torsional movement of engine 106 are transferred to torsion bar 112 via top and bottom arm assemblies 122a, 122b.

Top scissor mount 126a includes blades 132a, 132b rotatably coupled to one another at a fulcrum 134a. Blades 132a, 132b are each bifurcated into tines 136 between which top engine lugs 128a, 128b may be interposed. Bottom scissor mount 126b includes blades 132c, 132d rotatably coupled to one another at fulcrum 134b. Blades 132c, 132d each bifurcate into tines 138 between which bottom engine lugs 128c, 128d may be interposed. The rotatable connection between blades 132a, 132b at fulcrum 134a for top scissor mount 126a and between blades 132c, 132d at fulcrum 134b for bottom scissor mount 126b prevents stresses and loads on engine 106 by allowing scissor mounts 126a, 126b to open and close in response to, for example, thermal expansion of engine 106. Any bolt, pin or other fastener may be used at fulcrums 134a, 134b that allows for blades 132a, 132b and blades 132c, 132d to rotate relative to one another, respectively. Ends 140a, 140b of top linkage 130a may be movably coupled to top scissor mount 126a and top end bell crank 124a via spherical bearings. Likewise, ends 140c, 140d of bottom linkage 130b may be movably coupled to bottom scissor mount 126b and bottom end bell crank 124b via spherical bearings. The spherical bearings located at ends 140a, 140b, 140c, 140d of linkages 130a, 130b allow top and bottom arm assemblies 122a, 122b to accommodate vertical and fore-aft movement of engine 106. For example, when engine 106 moves vertically, as shown in FIGS. 8A-8B, the spherical bearings allow linkages 130a, 130b to rotate up and down relative to end bell cranks 124a, 124b, respectively, so that vertical motion may be accommodated by top and bottom arm assemblies 122a, 122b.

Engine mount assembly 104 includes a lateral movement control assembly 142 coupled to torsion bar 112. Lateral movement control assembly 142, or a portion thereof, has a lateral stiffness that controls lateral movement of engine 106. Lateral movement control assembly 142 includes a middle bell crank 144 fixedly coupled to a middle section 146 of torsion bar 112. Middle bell crank 144 may be fixedly coupled at the midpoint of torsion bar 112, or, as illustrated, may be slightly offset from the midpoint of torsion bar 112. For example, for a torsion bar measuring approximately 18 inches in length, middle bell crank 144 may be offset from the midpoint of torsion bar 112 by 3 inches or less. In this example, middle bell crank 144 may be offset from the midpoint of torsion bar 112 by 1-2 inches. Middle bell crank 144 is coupled to a spring 148 by a lateral link 150. In some embodiments, middle bell crank 144 may be coupled to lateral link 150 via a spherical bearing, thereby allowing for a range of motion between middle bell crank 144 and lateral link 150 in multiple degrees of freedom. When engine 106 moves laterally, torsion bar 112 rotates and middle bell crank 144 transfers the rotational energy of torsion bar 112 to spring 148. Spring 148 has a lateral stiffness that controls or restrains lateral movement of engine 106. Spring 148 may be any type of spring, such as a coiled spring, leaf spring or flexure, and may be made of any material such as elastomer, silicone, composite or metal. Indeed, spring 148 may be any shape, and be made from any material, capable of being compressed or stretched to provide a suitable stiffness or elasticity to control the lateral movement of engine 106. In other embodiments, more than one spring may be utilized to obtain a lateral stiffness for the lateral movement control assembly 142.

Engine mount assembly 104 includes a vertical movement control assembly 152 that has a vertical stiffness to independently control the vertical movement of engine 106. Vertical movement control assembly 152 is divided into a top vertical movement control assembly 154a coupled to top side 120a of engine 106 via top scissor mount 126a and bottom vertical movement control assembly 154b coupled to bottom side 120b of engine 106 via bottom scissor mount 126b. Top vertical movement control assembly 154a includes a top support arm 156a fixedly coupled to airframe 102. Top support arm 156a is coupled to top scissor mount 126a by a top vertical support linkage 158a. Top end 160a of top vertical support linkage 158a is coupled to top support arm 156a and bottom end 160b of top vertical support linkage 158a is coupled to fulcrum 134a of top scissor mount 126a. In some embodiments, top end 160a of top vertical support linkage 158a is movably coupled to top support arm 156a via a spherical bearing and bottom end 160b of top vertical support linkage 158a is movably coupled to fulcrum 134a of top scissor mount 126a via a spherical bearing to permit engine 106 to move in multiple degrees of freedom, including the fore-aft direction.

Bottom vertical movement control assembly 154b includes bottom support arm 156b fixedly coupled to support spine 110. In other embodiments, bottom support arm 156b may be directly coupled to airframe 102. In yet other embodiments, support spine 110 and bottom support arm 156b may be a single part formed from the same piece of material. Bottom vertical movement control assembly 154b includes bottom vertical support linkage 158b coupling bottom support arm 156b to bottom side 120b of engine 106 via bottom scissor mount 126b. Top end 160c of bottom vertical support linkage 158b is coupled to fulcrum 134b of bottom scissor mount 126b and bottom end 160d of bottom vertical support linkage 158b is coupled to bottom support arm 156b. In some embodiments, ends 160c, 160d of bottom vertical support linkage 158b may each be coupled to fulcrum 134b and bottom support arm 156b, respectively, via spherical bearings to permit engine 106 to move in multiple degrees of freedom, including the fore-aft direction. Top vertical support linkage 158a has a loop structure and bottom vertical support linkage 158b has a linear structure. In other embodiments, however, either or both of top or bottom vertical support linkages 158a, 158b may have a looped, linear or any other structure suitable for the application. Both the top and bottom vertical movement control assemblies 154a, 154b have vertical stiffnesses that may be selected to control vertical movement of engine 106.

Referring specifically to FIGS. 4A-4D, 5A-5D, 6A-6D, 7A-7D and 8A-8B, engine mount assembly 104 operates to provide different load paths for lateral, torsional and vertical movement of engine 106 so that the stiffnesses in each of these directions are decoupled, or independently controlled, from one another. In particular, lateral movement of engine 106, as illustrated in FIGS. 4A-4D and 5A-5D is independently controllable based on the lateral stiffness of spring 148. Torsional movement of engine 106, as shown in FIGS. 6A-6D and 7A-7D, is independently controllable based on the torsional stiffness of torsion bar 112. The vertical movement of engine 106, as shown in FIGS. 8A-8B, is independently controllable based on the vertical stiffnesses of top and bottom vertical movement control assemblies 154a, 154b. Because the lateral, torsional and vertical load paths are stiffened by different elements of engine mount assembly 104, movement, including vibration, of engine 106 in the lateral, torsional and vertical directions may be controlled independently of one another to allow for the fine tuning of stiffnesses in each of these directions to meet operational parameters or constraints.

Referring specifically to FIGS. 4A-4D and 5A-5D, the lateral load path of engine mount assembly 104 is illustrated. When engine 106 is at rest and experiences no movement or vibration, engine 106 is in a neutral position 162. When engine 106 moves to an outer lateral position 164, as shown in FIG. 4A, such movement is transferred through top and bottom arm assemblies 122a, 122b to rotate end bell cranks 124a, 124b in the same direction that engine 106 has moved. End bell cranks 124a, 124b rotate in the same direction away from support spine 110 as best seen in FIGS. 4B and 4D. Because end bell cranks 124a, 124b are fixedly coupled to ends 118a, 118b of torsion bar 112, respectively, torsion bar 112 rotates in the same direction as end bell cranks 124a, 124b. Middle bell crank 144, by virtue of being fixedly coupled to middle section 146 of torsion bar 112, rotates in the same direction as end bell cranks 124a, 124b and torsion bar 112, thus transferring the rotational energy of torsion bar 112 to spring 148. The rotation of middle bell crank 144 in the same direction as end bell cranks 124a, 124b is best seen in FIG. 4C. Conversely, when engine 106 moves to an inner lateral position 166, as shown in FIG. 5A, end bell cranks 124a, 124b and middle bell crank 144 all rotate in the same direction of movement of engine 106 and toward support spine 110, as shown in FIGS. 5B-5D. Thus, the lateral load path of engine mount assembly 104 is directed to spring 148, whose lateral stiffness controls the lateral movement of engine 106. A suitable lateral stiffness of spring 148 may be obtained by varying the shape of spring 148 or the material from which spring 148 is composed. In this manner, lateral movement of engine 106 is controlled independently from torsional and vertical movement of engine 106. Thus, changing the lateral stiffness of spring 148 does not substantially affect the torsional and vertical movement of engine 106.

Referring specifically to FIGS. 6A-6D and 7A-7D, the torsional load path of engine mount assembly 104 is illustrated. Engine 106 oscillates about engine axis 168 from neutral position 162, in which engine 106 is substantially vertical. In FIG. 6A, top side 120a of engine 106 has tilted away from torsion bar 112 while bottom side 120b of engine 106 has tilted toward torsion bar 112, thus causing end bell cranks 124a, 124b to rotate in opposite directions, as shown in FIGS. 6B and 6D. End bell cranks 124a, 124b also move in opposite directions when top side 120a of engine 106 tilts toward torsion bar 112 and bottom side 120b of engine 106 tilts away from torsion bar 112, as shown in FIGS. 7A-7D. When torsional movement of engine 106 causes end bell cranks 124a, 124b to rotate in opposite directions, torsion bar 112 experiences torsion. Thus, the torsional stiffness of torsion bar 112 controls the torsional movement of engine 106. In some embodiments, torsional stiffness of torsion bar 112 may be expressed as GJ/L, wherein G is the rigidity modulus of the material from which torsion bar 112 is made, J is the torsion constant for torsion bar 112 and L is the length of torsion bar 112.

The torsional stiffness of torsion bar 112 may be varied to achieve a desired amount of torsional movement for engine 106. For example, the diameter of torsion bar 112 may be increased to decrease the torsional movement of engine 106. Conversely, the diameter of torsion bar 112 may be decreased to allow additional torsional movement for engine 106. Also, while torsion bar 112 is illustrated as having a generally cylindrical shape, torsion bar 112 may have a cross-sectional shape other than a circle, such as a square, polygon or other shape. The shape of torsion bar 112 may be varied to change the torsional stiffness of torsion bar 112. The torsional stiffness of torsion bar 112 may also be varied by changing the material from which torsion bar 112 is made. In some embodiments, torsion bar 112 may be a metal or composite tube or rod. For example, torsion bar 112 may be formed from steel, such as stainless steel. Torsion bar 112 may also be any length depending on the application, and may be affected by the size of engine 106 or engine mount assembly 104, as well as other factors.

The torsional load path of engine mount assembly 104 is directed to torsion bar 112 such that torsional movement of engine 106 is controlled by the torsional stiffness of torsion bar 112. Torsion bar 112 transmits the lateral motion of engine 106 to spring 148, but self-reacts to torsional movement of engine 106. Middle bell crank 144, by virtue of being located in middle section 146 of torsion bar 112, is substantially stationary when engine 106 experiences torsional movement, as shown in FIGS. 6C and 7C, and thus does not exert a force upon spring 148. Thus, torsional movement of engine 106 is controlled independently of lateral movement of engine 106. The torsional stiffness of torsion bar 112, while controlling torsional movement of engine 106, does not substantially affect lateral and vertical movement of engine 106. Thus, torsion bar 112 can be designed or selected so as to achieve desired tuning in the torsional load direction.

Referring to FIGS. 8A and 8B, the vertical load path of engine mount assembly 104 is illustrated. In FIG. 8A, engine 106 has moved downward from neutral position 162, thereby stretching top vertical movement control assembly 154a and compressing bottom vertical movement control assembly 154b. In FIG. 8B, engine 106 has moved upward of neutral position 162, thereby compressing top vertical movement control assembly 154a and stretching bottom vertical movement control assembly 154b. The vertical stiffnesses of top and bottom vertical movement control assemblies 154a, 154b, including support arms 156a, 156b and vertical support linkages 158a, 158b, control vertical movement of engine 106 independent of lateral or torsional movement of engine 106. Utilizing stiffer materials or shapes for support arms 156a, 156b and vertical support linkages 158a, 158b limits vertical movement of engine 106, while more elastic materials or shapes for support arms 156a, 156b or vertical support linkages 158a, 158b permits more vertical movement of engine 106. Vertical support linkages 158a, 158b may be made from elastomer, silicone, composite, metal or other suitable materials. In some embodiments, support arms 156a, 156b or vertical support linkages 158a, 158b may be made from titanium or steel, such as stainless steel. Vertical support linkages 158a, 158b may also be metal flexures. Because vertical motion of engine 106 is controlled by the stiffness of vertical movement control assemblies 154a, 154b, while torsional motion of engine 106 is controlled by the torsional stiffness of torsion bar 112 and lateral motion of engine 106 is controlled by the lateral stiffness of spring 148, vertical motion of engine 106 is controlled independently of both lateral and vertical movement of engine 106.

Thus, the lateral, torsional and vertical load paths are each directed to different elements of engine mount assembly 104, namely spring 148, torsion bar 112 and vertical movement control assembly 152, thus allowing individual stiffness tailoring of the lateral, torsional and vertical load paths. The stiffness of the lateral load path can be tailored by design of spring 148, the stiffness of the torsional load path can be tailored by design of torsion bar 112, and the stiffness of the vertical load path can be tailored by design of the vertical movement control assembly 152. By using the illustrative embodiments, placement of the engine's natural frequencies may be tailored to the particular application. Individual stiffness targets or ranges in the lateral, torsional or vertical directions may be more easily met since the adjustment of stiffness in any one of these directions does not affect the other two. In effect, stiffness in any one of the lateral, torsional or vertical directions can be isolated or decoupled from the stiffness in the other two directions. In contrast, previous engine mounting configurations cannot independently tune each of the fundamental lateral, torsional and vertical engine modes of vibration. For example, stiffening one load path in these previous systems to increase a desired engine mode would subsequently increase the mode placement of the other coupled direction, thus making stiffness tailoring for dynamic tuning difficult or even impossible to achieve. It will be appreciated by one of ordinary skill in the art that lateral, torsional and vertical movement of engine 106 encompasses lateral, torsional and vertical modes of vibration of engine 106 such that the modes of vibration in each of these directions may be independently controlled by the illustrative embodiments. Thus, undesirable modes of vibration in any of these directions may be eliminated using the illustrative embodiments. By way of non-limiting example, the frequency of oscillation of engine 106 in any of the lateral, torsional or vertical directions may be kept in a range of 12-14 Hz to eliminate interference with a vibrational mode from another structure of the aircraft.

Referring to FIGS. 9 and 10A-10D, an engine mount assembly having tapered socket connections is generally designated 200. Engine mount assembly 200 includes top and bottom end bell cranks 202, 204 fixedly coupled to top and bottom ends 206, 208 of torsion bar 210, respectively. End bell cranks 202, 204 rotate in the same direction in response to lateral movement of the engine, and rotate in opposite directions in response to torsional movement of the engine. End bell cranks 202, 204 are both fixedly coupled to torsion bar 210 using a tapered socket connection, which is representatively described with reference to top end bell crank 202 in FIGS. 10A-10D. Top end 206 of torsion bar 210 includes a tapered boss 212. Top end bell crank 202 forms a tapered socket 214. Tapered socket 214 receives tapered boss 212 to secure top end bell crank 202 to torsion bar 210 such that top end bell crank 202 rotates with torsion bar 210.

Tapered boss 212 has three tapered sides 216 to form a substantially triangular boss. Tapered boss 212, however, may have any number of tapered sides to form any polygonal shape. Tapered socket 214 also has three tapered sides 218 to form a substantially triangular socket to conformably receive tapered boss 212. In other embodiments, however, tapered socket 214 may have any number of tapered sides to form any polygonal shape. Tapered boss 212 or tapered socket 214 may have either a symmetric or non-symmetric shape. In other embodiments, tapered boss 212 and tapered socket 214 may form external and internal splines to form a splined connection. In yet other embodiments, a screw drive may be utilized to connect top end bell crank 202 to top end 206 of torsion bar 210. Tapered sides 216 of tapered boss 212 each have the same taper angle 220. Likewise, tapered sides 218 of tapered socket 214 each have the same taper angle 222. Taper angle 220 of tapered sides 216 of tapered boss 212 is substantially the same as taper angle 222 of tapered sides 218 of tapered socket 214. When tapered socket 214 receives tapered boss 212, tapered sides 216 of tapered boss 212 each abut at least a portion of one of tapered sides 218 of tapered socket 214 to provide a firm and secure contact connection between top end bell crank 202 and top end 206 of torsion bar 210. Taper angles 220, 222 may be any angle that provides a firm, secure or fixed connection, including, but not limited to, 1 degree, 5 degrees, 10 degrees or any other suitable angle.

The connection between top end bell crank 202 and torsion bar 210 may be further secured by a screw 224 or other fastener. Tapered boss 212 includes a threaded receiving hole 226. Tapered socket 214 forms an aperture 228. Screw 224 is inserted through aperture 228 and threaded receiving hole 226 to tighten tapered socket 214 against tapered boss 212, thereby pressing tapered sides 218 of tapered socket 214 against tapered sides 216 of tapered boss 212. The force exerted by screw 224 reduces movement between tapered socket 214 and tapered boss 212. A washer 230 may be used to further secure the connection. In other embodiments, threaded receiving hole 226 may be non-threaded or straight, and screw 224 may be a non-threaded fastener, such as a bolt or pin. By driving the female taper of tapered socket 214 onto the male taper of tapered boss 212, backlash or "slop" between torsion bar 210 and top end bell crank 202 may be reduced or eliminated. Tapered boss 212 and tapered socket 214 of top end bell crank 202 is representative of the tapered boss and tapered socket that may be used to fixedly couple bottom end bell crank 204 to bottom end 208 of torsion bar 210. In addition, the tapered sockets and bosses of the illustrative embodiments may be used to secure connections elsewhere on engine mount assembly 200.

Top end bell crank 202 includes a bell crank arm 232 that forms a bell crank arm socket 234. Bell crank arm socket 234 is adapted to receive end 236 of linkage 238. Bell crank arm 232 includes linkage securing apertures 240, 242 adjacent to bell crank arm socket 234. A bolt 244 is insertable through linkage securing apertures 240, 242 and end 236 of linkage 238 to secure end 236 of linkage 238 within bell crank arm socket 234. In some embodiments, end 236 of linkage 238 may be movably coupled to bell crank arm 232 at bell crank arm socket 234 via a spherical bearing. The same or similar features described for top end bell crank 202 may also be included for bottom end bell crank 204, including the connection between linkage 246 and bottom end bell crank 204.

Referring to FIGS. 11, 12A-12D and 13A-13B in the drawings, a lateral movement control assembly for an engine mount assembly is schematically illustrated and generally designated 300. In response to lateral movement of the engine, torsion bar 302 rotates, which causes middle bell crank 304 to rotate in the same direction as torsion bar 302 such that the rotational energy of torsion bar 302 is transferred to a beam spring 306 via interposed lateral link 308. The lateral stiffness of beam spring 306 controls lateral movement of the engine. The position of middle bell crank 304 near midpoint 310 of torsion bar 302 causes middle bell crank 304 to remain substantially stationary when torsion bar 302 experiences torsion in response to torsional movement of the engine. In some embodiments, middle bell crank 304 may be slightly offset from midpoint 310 of torsion bar 302. For example, for a torsion bar measuring approximately 18 inches in length, middle bell crank 304 may be offset from midpoint 310 by 1-2 inches to accommodate spatial considerations around the engine. In order for middle bell crank 304 to effectively rotate with torsion bar 302, without the adverse effects of backlash or "slop," the illustrated embodiment utilizes a spline to fixedly couple middle bell crank 304 to torsion bar 302. Lateral movement control assembly 300 is coupled to middle section 312 of torsion bar 302. Middle section 312 of torsion bar 302 includes an external spline 314. In a non-limiting example, for a torsion bar measuring approximately 18 inches in length, external spline 314 may be offset from midpoint 310 by 3 inches or less. In other embodiments, middle section 312 of torsion bar 302 may have a reduced diameter adjacent to external spline 314, as shown in FIG. 12D. In such embodiments, middle section 312, or a portion thereof, may be machined to a smaller diameter to accommodate external spline 314.

Middle bell crank 304 includes a clamp 316 that forms an internal spline 318 that mates with external spline 314 of torsion bar 302 to secure middle bell crank 304 to torsion bar 302 such that middle bell crank 304 rotates with torsion bar 302. Clamp 316 includes two branches 320, 322 each forming a portion of internal spline 318. Branches 320, 322 each include a securing tab 324, 326. Securing tabs 324, 326 are pressable toward one another to secure clamp 316 to torsion bar 302. Securing tabs 324, 326 may be preloaded to deform clamp 316 to tighten around external spline 314, thereby eliminating backlash or "slop" between middle bell crank 304 and torsion bar 302. Any method of preloading clamp 316 may be utilized, such as a separate clamp or a bolt. In the illustrated embodiment, securing tabs 324, 326 each include an aperture 328, 330 through which a bolt 332 is insertable. A nut 334 threads onto bolt 332 to tighten securing tabs 324, 326 against one another.

External spline 314 includes outward-facing teeth 336 and internal spline 318 includes inward-facing teeth 338. Inward-facing teeth 338 of clamp 316 mate with outward-facing teeth 336 of torsion bar 302. Outward-facing teeth 336 are substantially parallel to one another and extend radially outward from torsion bar 302. Inward-facing teeth 338 are substantially parallel to one another and extend radially inward toward the central longitudinal axis of torsion bar 302. Outward- and inward-facing teeth 336, 338 may have any shape that allows for a mateable or interlocking fit. In the illustrated embodiment, each of outward- and inward-facing teeth 336, 338 are flat-topped teeth. In other embodiments, the spline formed by clamp 316 and torsion bar 302 may be a parallel key spline, involute spline, crowned spline, serrated spline, helical spline, ball spline, standard spline pattern or any other type of spline.

In some embodiments, a shim (not shown) may be inserted between securing tabs 324, 326 to control tightening of clamp 316 onto torsion bar 302. Any size shim may be used. For example, if the application calls for a tightness around torsion bar 302 such that gap 340 between securing tabs 324, 326 is 20/1000ths of an inch, then a 20/1000ths of an inch shim may be inserted into gap 340 to ensure proper tightening of clamp 316. Middle bell crank 304 may be formed from any material, such as steel, including stainless steel. While a clamped spline connection is shown with reference to middle bell crank 304, the clamped splines disclosed herein may be used to connect other portions or parts of the engine mount assembly. For example, a clamp spline connection may be used to connect the top and bottom end bell cranks to the ends of torsion bar 302.

Middle bell crank 304 includes a bell crank arm 342 that bifurcates into two tines 344, 346. Tines 344, 346 each form an aperture 348, 350. Lateral link 308 has two ends 352, 354. Bolt 356 is inserted through end 354 of lateral link 308 and apertures 348, 350 such that end 354 of lateral link 308 is rotatably coupled to, and interposed between, tines 344, 346 of bell crank arm 342. End 352 of lateral link 308 bifurcates into tines 358, 360. Beam spring 306 is interposed between tines 358, 360. Beam spring 306 and tines 358, 360 each form an aperture through which bolt 362 is inserted to fixedly couple end 352 of lateral link 308 to middle section 364 of beam spring 306. The connection between end 352 of lateral link 308 and beam spring 306 is adjacent to midpoint 366 of beam spring 306, although, in other embodiments, the connection between end 352 of lateral link 308 and beam spring 306 may occur anywhere in middle section 364 of beam spring 306, including midpoint 366 itself. Middle bell crank 304 is coupled to beam spring 306 such that the rotational energy of torsion bar 302, caused by lateral movement of the engine, is transferable to beam spring 306. In particular, middle section 364 of beam spring 306 receives the rotational energy of torsion bar 302 when torsion bar 302 rotates. Each end 368, 370 of beam spring 306 is coupled to support spine 372 to form two connections 374, 376 with support spine 372.

Beam spring 306 has a lateral stiffness that resists rotation of middle bell crank 304. The lateral stiffness of beam spring 306 is exerted as middle bell crank 304, via lateral link 308, pulls or pushes against middle section 364 of beam spring 306 while opposing ends 368, 370 are pinned, or otherwise coupled, to support spine 372. Beam spring 306 resists rotation of torsion bar 302 during operation of the engine mount assembly such that lateral movement of the engine is controllable based on the lateral stiffness of beam spring 306. The lateral stiffness of beam spring 306 may be determined by the geometry, shape or material of beam spring 306. In the illustrated embodiment, beam spring 306 is a flat beam, although beam spring 306 may have any shape, cross-section or profile. Beam spring 306 may be formed from any material having any stiffness or elasticity, including steel or stainless steel. The shape of beam spring 306 is such that beam spring 306 has necks 378, 380 that are adjacent to ends 368, 370 and have reduced widths. Midpoint 366 of beam spring 306 has a greater width than necks 378, 380. The width of beam spring 306 gradually increases from necks 378, 380 to midpoint 366.

Connections 374, 376 at ends 368, 370 of beam spring 306 may be formed in a variety of ways. In the illustrated embodiment, each end 368, 370 forms an aperture through which bolts 382, 384 are inserted to mount beam spring 306 to support spine 372. While the illustrated embodiment shows beam spring 306 providing the lateral stiffness of lateral movement control assembly 300, in other embodiments other components or devices may provide a lateral stiffness, such as a coiled spring, flexure, elastomeric member or cantilevered beam. Beam spring 306 may provide spatial advantages compared to other types of springs since beam spring 306 has a slender profile that is easily mountable against other components, such as support spine 372. Although beam spring 306 is illustrated to provide a lateral stiffness for the lateral movement control assembly 300, a pinned beam spring may be used anywhere in the engine mount assembly to provide stiffness for any purpose.

Referring to FIGS. 14-16, 17A-17B and 18 in the drawings, an engine mount assembly utilizing one or more sleeved bolt assemblies is schematically illustrated and generally designated 400. In particular, FIG. 17A, which is a cross-sectional view taken along line 17A-17A of FIG. 15, and FIG. 17B illustrate sleeved bolt assembly 402 being utilized to secure blade 404 of bottom scissor mount 406 to engine lug 408 of engine 410. It will be appreciated by one of ordinary skill in the art, however, that sleeved bolt assembly 402 may be used anywhere on engine mount assembly 400 to secure any number or combination of parts to one another. For example, sleeved bolt assembly 402 may also be used to secure blade 412 to engine lug 414 such that both blades 404, 412 of bottom scissor mount 406 are each secured to engine 410 using a respective sleeved bolt assembly of the illustrative embodiments. Sleeved bolt assemblies may also be used to secure top scissor mount 416 to engine 410.

Sleeved bolt assembly 402, as illustrated, secures blade 404 to engine lug 408. Engine lug 408 protrudes from bottom side of 418 of engine 410. Engine lug 408 forms aperture 420. Blade 404 bifurcates into tines 422, 424 each forming an aperture 426, 428 that substantially aligns with aperture 420 of engine lug 408. Engine lug 408 is interposed between tines 422, 424 of blade 404. A bolt 430, having a head 432 and a stem 434, is inserted through aperture 426 of tine 422, aperture 420 of engine lug 408 and aperture 428 of tine 424 to secure blade 404 to engine lug 408. Tines 422, 424 and bolt 430 approximate a clevis arrangement, although the use of sleeved bolt assembly 402 is not limited to such arrangements. Bolt 430 is undersized relative to aligned apertures 420, 426, 428 to form a circumferential gap 436 around stem 434 of bolt 430 and within apertures 420, 426, 428. A sleeve 438, which is cylindrically shaped and has a central channel 440 therethrough, is inserted to partially, substantially or fully fill circumferential gap 436. In the illustrated embodiment, sleeve 438 is disposed in all three aligned apertures 420, 426, 428. Central channel 440 of sleeve 438 receives stem 434 of bolt 430.

Aligned apertures 420, 426, 428 have two entry ends 442, 444 into which either bolt 430 or sleeve 438 may be inserted. In the illustrated embodiment, bolt 430 is inserted at entry end 442 and sleeve 438 is inserted at entry end 444. In other embodiments, however, bolt 430 may be inserted at entry end 444 and sleeve 438 may be inserted at entry end 442. Such interchangeability of insertion may be useful when limited clearance to surrounding structures does not permit the insertion of either bolt 430 or sleeve 438 through one of entry ends 442, 444. As best seen in FIG. 17B, which is a cross-sectional view taken along line 17B-17B of FIG. 17A, sleeved bolt assembly 402, with the inclusion of sleeve 438, allows bolt 430 to be undersized relative to apertures 420, 426, 428. In this cross-section, aperture 426 has a diameter 446. Sleeve 438 has a wall thickness 448. Stem 434 of bolt 430 has a diameter 450 that is equal or approximate to D-(2T), wherein D is diameter 446 of aperture 426 and T is wall thickness 448 of sleeve 438. At least one end 452 of sleeve 438 may include a flange 454. Flange 454 may perform a variety of functions, including limiting the insertion of sleeve 438 into circumferential gap 436 or acting as a washer against which a nut 456 may be threaded. Sleeve 438 may be made from any material, including steel such as high temperature-tolerant steel. High temperature-tolerant steel may be suitable when sleeved bolt assembly 402 is used at or near high temperature components, such as engine 410.

As best seen in FIG. 17A, aperture 428 of tine 424 has a larger diameter than both aperture 426 of tine 422 and aperture 420 of engine lug 408, thereby forming an outer circumferential gap 458 at entry end 444. A slip bushing 460 is insertable into outer circumferential gap 458 such that flange 454 abuts slip bushing 460. Slip bushing 460 may be used to push engine lug 408 against tine 422 when sleeved bolt assembly 402 is fully engaged, thereby providing a tighter fit between these elements. End 462 of bolt 430, which is opposite of head 432, may include a threaded portion 464 onto which nut 456 may be threaded to abut flange 454 of sleeve 438. Nut 456 is undersized to accommodate undersized bolt 430, thereby increasing clearance 466 between sleeved bolt assembly 402 and surrounding structure, such as engine 410. Sleeved bolt assembly 402 may also include a washer 468, and threaded portion 464 of bolt 430 may include a safety hole (not shown) adjacent to nut 456 into which a pin (not shown), such as a cotter pin, may be inserted to prevent parts of sleeved bolt assembly 402 from disengaging.

Bolt 430, being undersized, permits increased clearance 466 between head 432, nut 456 or other portions of sleeved bolt assembly 402 and structure surrounding sleeved bolt assembly 402, such as engine 410. Such increased clearance 466 also allows increased access to install sleeved bolt assembly 402. For example, regular-sized bolts and nuts may be too large to install due to obstruction by the structure and shape of engine 410. FIG. 18 shows a traditional bolt stack up with a traditional bushing arrangement. In FIG. 18, the bolt substantially fills apertures 420, 426, 428. The traditional bolt assembly in FIG. 18 has a reduced clearance 470 with engine 410. The regular-sized bolt in FIG. 18 may be unable to be installed due to its large size, in particular because of the obstruction caused by engine 410. Thus, sleeved bolt assembly 402 of the illustrative embodiments is particularly well-suited to secure elements with tight clearances to adjacent structure. Despite having a reduced size for bolt 430 and nut 456, sleeved bolt assembly 402 maintains load or shear requirements due to the additional stress tolerance supplied by the added thickness 448 of sleeve 438. Thus, sleeved bolt assembly 402 increases clearance 466 to adjacent structure while maintaining strength requirements for use in high load environments, such as engine mounts. It will be appreciated by one of ordinary skill in the art that although sleeved bolt assembly 402 is shown to secure scissor mount 406 to engine 410, sleeved bolt assembly 402 may be used to secure any type of mount to engine 410. Furthermore, any number of sleeved bolt assemblies may be used in engine mount assembly 400.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An engine mount assembly for coupling an engine to an airframe, the engine mount assembly comprising:
    a torsion bar coupled between the engine and the airframe, the torsion bar including an external spline; and
    a bell crank including a clamp forming an internal spline;
    wherein the internal spline of the bell crank is adapted to mate with the external spline of the torsion bar to secure the bell crank to the torsion bar such that the bell crank rotates with the torsion bar responsive to movements of the engine.

2. The engine mount assembly as recited in claim 1 wherein the bell crank further comprises a bell crank arm including first and second tines, the first and second tines each including an aperture.

3. The engine mount assembly as recited in claim 1 wherein the torsion bar has a middle section and wherein the external spline is located proximate the middle section of the torsion bar.

4. The engine mount assembly as recited in claim 1 wherein the bell crank further comprises steel.

5. The engine mount assembly as recited in claim 1 wherein the engine is subject to torsional movement causing the torsion bar to experience torsion and wherein the bell crank is substantially stationary in response to torsion of the torsion bar caused by the torsional movement of the engine.

6. The engine mount assembly as recited in claim 5 wherein the torsion bar has a torsional stiffness such that torsional movement of the engine is controllable based on the torsional stiffness of the torsion bar.

7. The engine mount assembly as recited in claim 1 wherein the engine is subject to lateral movement causing the torsion bar to rotate and wherein the bell crank rotates in response to rotation of the torsion bar caused by the lateral movement of the engine.

8. The engine mount assembly as recited in claim 7 further comprising a beam spring coupled between the bell crank and the airframe, the beam spring having a lateral stiffness to resist rotation of the bell crank such that lateral movement of the engine is controllable based on the lateral stiffness of the beam spring.

9. The engine mount assembly as recited in claim 1 wherein the clamp further comprises first and second branches each forming a portion of the internal spline.

10. The engine mount assembly as recited in claim 9 wherein the first and second branches each further comprise a securing tab, the securing tabs pressable toward one another to secure the clamp to the torsion bar.

11. The engine mount assembly as recited in claim 10 wherein each of the securing tabs further comprise an aperture; and
    wherein the engine mount assembly further comprises a bolt insertable into the apertures of the securing tabs and a nut adapted to thread onto the bolt to secure the clamp to the torsion bar.

12. The engine mount assembly as recited in claim 10 further comprising a shim insertable between the securing tabs to control a distance between the securing tabs.

13. A rotorcraft comprising:
    an airframe;
    an engine;
    an engine mount assembly adapted to mount the engine to the airframe, the engine mount assembly including:
    a torsion bar having an external spline; and
    a bell crank including a clamp forming an internal spline;
    wherein the internal spline of the bell crank is adapted to mate with the external spline of the torsion bar to secure the bell crank to the torsion bar such that the bell crank rotates with the torsion bar responsive to movements of the engine.

14. The rotorcraft as recited in claim 13 wherein the torsion bar has a middle section and wherein the external spline is located proximate the middle section of the torsion bar.

15. The rotorcraft as recited in claim 13 wherein the engine is subject to lateral movement causing the torsion bar to rotate and wherein the bell crank rotates in response to rotation of the torsion bar caused by the lateral movement of the engine.

16. The rotorcraft as recited in claim 13 wherein the engine is subject to torsional movement causing the torsion bar to experience torsion and wherein the bell crank is substantially stationary in response to torsion of the torsion bar caused by the torsional movement of the engine.

17. A tiltrotor aircraft having a helicopter mode and an airplane mode, the tiltrotor aircraft comprising:
    an airframe including a fuselage, a wing and a nacelle;
    an engine disposed within the nacelle;
    an engine mount assembly adapted to mount the engine to the airframe, the engine mount assembly including:
    a torsion bar having an external spline; and
    a bell crank including a clamp forming an internal spline;
    wherein the internal spline of the bell crank is adapted to mate with the external spline of the torsion bar to secure the bell crank to the torsion bar such that the bell crank rotates with the torsion bar responsive to movements of the engine.

18. The tiltrotor aircraft as recited in claim 17 wherein the torsion bar has a middle section and wherein the external spline is located proximate the middle section of the torsion bar.

19. The tiltrotor aircraft as recited in claim 17 wherein the engine is subject to lateral movement causing the torsion bar to rotate and wherein the bell crank rotates in response to rotation of the torsion bar caused by the lateral movement of the engine.

20. The tiltrotor aircraft as recited in claim 17 wherein the engine is subject to torsional movement causing the torsion bar to experience torsion and wherein the bell crank is substantially stationary in response to torsion of the torsion bar caused by the torsional movement of the engine.

* * * * *